US011528141B2

(12) United States Patent
Konda et al.

(10) Patent No.: US 11,528,141 B2
(45) Date of Patent: *Dec. 13, 2022

(54) METHODS AND SYSTEMS FOR ENHANCING PRIVACY AND EFFICIENCY ON DISTRIBUTED LEDGER-BASED NETWORKS

(71) Applicant: EYGS LLP, London (GB)

(72) Inventors: Chaitanya Reddy Konda, London (GB); Duncan James Westland, Addlestone (GB); Paul Richard Brody, Woodside, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/904,296

(22) Filed: Jun. 17, 2020

(65) Prior Publication Data

US 2020/0322154 A1 Oct. 8, 2020

Related U.S. Application Data

(63) Continuation of application No. 16/283,452, filed on Feb. 22, 2019, now Pat. No. 10,721,069.

(Continued)

(51) Int. Cl.
*H04L 9/32* (2006.01)
*H04L 9/06* (2006.01)
(Continued)

(52) U.S. Cl.
CPC .......... *H04L 9/3218* (2013.01); *H04L 9/0643* (2013.01); *H04L 9/30* (2013.01);
(Continued)

(58) Field of Classification Search
CPC ....... H04L 9/3218; H04L 9/0643; H04L 9/30; H04L 9/3213; H04L 9/3234; H04L 9/3242

See application file for complete search history.

(56) References Cited

U.S. PATENT DOCUMENTS

| 5,892,900 A | 4/1999 | Ginter et al. |
| 7,574,383 B1 | 8/2009 | Parasnis et al. |
| (Continued) |

FOREIGN PATENT DOCUMENTS

| CN | 107274184 A | 10/2017 |
| CN | 110033377 A | 7/2019 |
| (Continued) |

OTHER PUBLICATIONS

International Search Report and Written Opinion for International Application No. PCT/US2019/056646, dated Jan. 15, 2020, 12 pages.

(Continued)

*Primary Examiner* — Noura Zoubair
(74) *Attorney, Agent, or Firm* — Cooley LLP

(57) ABSTRACT

One or more embodiments described herein disclose methods and systems that are directed at providing enhanced privacy, efficiency and security to distributed ledger-based networks (DLNs) via the implementation of zero-knowledge proofs (ZKPs) in the DLNs. ZKPs allow participants of DLNs to make statements on the DLNs about some private information and to prove the truth of the information without having to necessarily reveal the private information publicly. As such, the disclosed methods and systems directed at the ZKP-enabled DLNs provide privacy and efficiency to participants of the DLNs while still allowing the DLNs to remain as consensus-based networks.

27 Claims, 3 Drawing Sheets

Related U.S. Application Data

(60) Provisional application No. 62/748,002, filed on Oct. 19, 2018, provisional application No. 62/719,636, filed on Aug. 18, 2018.

(51) Int. Cl.
*H04L 9/30* (2006.01)
*H04L 9/00* (2022.01)

(52) U.S. Cl.
CPC .......... *H04L 9/3213* (2013.01); *H04L 9/3234* (2013.01); *H04L 9/3242* (2013.01); *H04L 9/3221* (2013.01); *H04L 9/50* (2022.05)

(56) References Cited

U.S. PATENT DOCUMENTS

| | | |
|---|---|---|
| 9,397,985 B1 | 7/2016 | Seger, II et al. |
| 9,608,829 B2 | 3/2017 | Spanos et al. |
| 9,785,369 B1 | 10/2017 | Ateniese et al. |
| 9,794,074 B2 | 10/2017 | Toll et al. |
| 9,870,508 B1 | 1/2018 | Hodgson et al. |
| 9,881,176 B2 | 1/2018 | Goldfarb et al. |
| 9,906,513 B2 | 2/2018 | Wuehler |
| 9,942,231 B1 | 4/2018 | Laucius et al. |
| 9,948,467 B2 | 4/2018 | King |
| 9,959,065 B2 | 5/2018 | Ateniese et al. |
| 10,026,118 B2 | 7/2018 | Castinado et al. |
| 10,298,395 B1 | 5/2019 | Schiatti et al. |
| 10,438,290 B1 | 10/2019 | Winklevoss et al. |
| 10,505,726 B1 | 12/2019 | Andon et al. |
| 10,521,780 B1 | 12/2019 | Hopkins, III et al. |
| 10,540,654 B1 | 1/2020 | James et al. |
| 10,721,069 B2 | 7/2020 | Konda et al. |
| 11,206,138 B2 | 12/2021 | Canterbury et al. |
| 11,232,439 B2 | 1/2022 | Westland |
| 11,316,691 B2 | 4/2022 | Westland |
| 2002/0143598 A1 | 10/2002 | Scheer |
| 2005/0177435 A1 | 8/2005 | Lidow |
| 2009/0204517 A1 | 8/2009 | Edens et al. |
| 2012/0108446 A1 | 5/2012 | Wu et al. |
| 2014/0109245 A1 | 4/2014 | Pestell |
| 2014/0358745 A1 | 12/2014 | Lunan |
| 2015/0018406 A1 | 1/2015 | Glimcher et al. |
| 2016/0260169 A1* | 9/2016 | Arnold .................. G06Q 40/12 |
| 2016/0358165 A1* | 12/2016 | Maxwell ............ G06Q 20/0655 |
| 2017/0091750 A1 | 3/2017 | Maim |
| 2017/0278100 A1 | 9/2017 | Kraemer et al. |
| 2017/0293503 A1 | 10/2017 | Curtis |
| 2017/0301047 A1 | 10/2017 | Brown et al. |
| 2017/0316162 A1 | 11/2017 | Wall Warner et al. |
| 2017/0346639 A1 | 11/2017 | Muftic |
| 2018/0005186 A1 | 1/2018 | Hunn |
| 2018/0048461 A1 | 2/2018 | Jutla et al. |
| 2018/0082043 A1 | 3/2018 | Witchey et al. |
| 2018/0101701 A1 | 4/2018 | Barinov et al. |
| 2018/0139043 A1 | 5/2018 | Jayachandran et al. |
| 2018/0165131 A1 | 6/2018 | O'Hare et al. |
| 2018/0173378 A1 | 6/2018 | Tinari et al. |
| 2018/0174097 A1 | 6/2018 | Liu et al. |
| 2018/0189753 A1 | 7/2018 | Konda et al. |
| 2018/0218176 A1 | 8/2018 | Voorhees et al. |
| 2018/0218469 A1 | 8/2018 | Lert, Jr. et al. |
| 2018/0237863 A1 | 8/2018 | Namsaraev et al. |
| 2018/0331832 A1 | 11/2018 | Pulsifer |
| 2019/0007381 A1 | 1/2019 | Isaacson et al. |
| 2019/0012662 A1* | 1/2019 | Krellenstein .......... G06Q 40/04 |
| 2019/0034923 A1* | 1/2019 | Greco .................. G06Q 20/383 |
| 2019/0080407 A1 | 3/2019 | Molinari et al. |
| 2019/0108482 A1 | 4/2019 | Vikas et al. |
| 2019/0130701 A1 | 5/2019 | Simons |
| 2019/0164153 A1 | 5/2019 | Agrawal et al. |
| 2019/0164223 A1 | 5/2019 | De Jong |
| 2019/0266577 A1 | 8/2019 | Baldet et al. |
| 2019/0279204 A1 | 9/2019 | Norton et al. |
| 2019/0299105 A1* | 10/2019 | Knight ................ G07F 17/3251 |
| 2019/0312869 A1 | 10/2019 | Han et al. |
| 2019/0319798 A1 | 10/2019 | Chalkias |
| 2019/0340269 A1 | 11/2019 | Biernat et al. |
| 2019/0340619 A1 | 11/2019 | Leong et al. |
| 2019/0385120 A1 | 12/2019 | Yund et al. |
| 2019/0385156 A1 | 12/2019 | Liu |
| 2020/0034788 A1 | 1/2020 | Ynion, Jr. |
| 2020/0034834 A1 | 1/2020 | Li et al. |
| 2020/0042913 A1 | 2/2020 | Kumar et al. |
| 2020/0059361 A1 | 2/2020 | Konda et al. |
| 2020/0059362 A1 | 2/2020 | Brody et al. |
| 2020/0059364 A1 | 2/2020 | Konda et al. |
| 2020/0065380 A1 | 2/2020 | Kartoun et al. |
| 2020/0065761 A1 | 2/2020 | Tatchell |
| 2020/0082336 A1 | 3/2020 | Vuppala et al. |
| 2020/0111068 A1 | 4/2020 | Scarselli |
| 2020/0174990 A1 | 6/2020 | Pratkanis |
| 2020/0175465 A1 | 6/2020 | Abuhab |
| 2020/0226741 A1 | 7/2020 | Correia Villa Real et al. |
| 2020/0235943 A1 | 7/2020 | Salimi et al. |
| 2020/0294128 A1 | 9/2020 | Cella |
| 2020/0320529 A1 | 10/2020 | Lyadvinsky et al. |
| 2020/0327473 A1 | 10/2020 | Zur et al. |
| 2020/0328893 A1 | 10/2020 | Westland |
| 2020/0351093 A1 | 11/2020 | Madhuram et al. |
| 2020/0351094 A1 | 11/2020 | Canterbury et al. |
| 2020/0410439 A1 | 12/2020 | Blackburn et al. |
| 2021/0004739 A1 | 1/2021 | Gill et al. |
| 2021/0042746 A1 | 2/2021 | Westland |
| 2021/0150626 A1 | 5/2021 | Robotham |
| 2021/0157947 A1 | 5/2021 | Biazetti et al. |
| 2021/0203488 A1 | 7/2021 | Stahl |
| 2021/0264444 A1 | 8/2021 | Chen et al. |
| 2021/0326872 A1 | 10/2021 | Robotham et al. |
| 2022/0108310 A1 | 4/2022 | Westland |

FOREIGN PATENT DOCUMENTS

| | | |
|---|---|---|
| WO | WO 2017/187395 | 11/2017 |
| WO | WO 2017/198891 | 11/2017 |
| WO | WO 2018/007828 | 1/2018 |
| WO | WO 2018/028777 | 2/2018 |
| WO | WO 2018/144302 | 8/2018 |
| WO | WO 2018/150275 | 8/2018 |
| WO | WO 2018/163044 | 9/2018 |
| WO | WO 2018/209153 | 11/2018 |
| WO | WO-2020263607 A1 | 12/2020 |
| WO | WO-2021061044 A1 | 4/2021 |

OTHER PUBLICATIONS

Office Action for U.S. Appl. No. 16/283,452, dated Jul. 10, 2019, 31 pages.
Office Action for U.S. Appl. No. 16/283,452, dated Nov. 6, 2019, 34 pages.
International Search Report and Written Opinion for International Application No. PCT/US2019/046532, dated Dec. 2, 2019, 10 pages.
International Search Report and Written Opinion for International Application No. PCT/US2019/046808, dated Dec. 2, 2019, 9 pages.
International Search Report and Written Opinion for International Application No. PCT/US2019/057246, dated Feb. 4, 2020, 8 pages.
International Search Report and Written Opinion for International Application No. PCT/US2019/057262, dated Jan. 24, 2020, 9 pages.
International Search Report and Written Opinion for International Application No. PCT/EP2020/060588, dated Jun. 24, 2020, 13 pages.
International Search Report and Written Opinion for International Application No. PCT/US2020/028128, dated Jun. 25, 2020, 9 pages.
Andreev, O., "Hidden in Plain Sight: Transacting Privately on a Blockchain. Introducing Confidential Assets in the Chain Protocol," [Online], Retrieved from the Internet: <URL: https://blog.chain.com/hidden-in-plain-sight-transacting-privately-on-a-blockchain-835ab7 . . . ], Retrieved on Aug. 27, 2018, 11 pages.

(56) References Cited

OTHER PUBLICATIONS

Ben-Sasson, E. et al., "Scalable, transparent, and post-quantum secure computational integrity," Cryptology ePrint Archive, Report 2018/046 (2018), 83 pages.

International Telecommunication Union, Telecommunication Standardization Sector, Focus Group on Application of Distributed Ledger Technology, DLT-O-067, Output Document, "Updated baseline text: D4.1—DLT regulatory framework," Apr. 2019, 45 pages.

Lee, C. H. et al., "Implementation of IoT system using blockchain with authentication and data protection," 2018 International Conference on Information Networking (ICOIN), IEEE, Jan. 10, 2018, pp. 936-940.

Menezes, A. et al., "Key Management Techniques," Chapter 13 in Handbook of Applied Cryptography, CRC Press, Boca Raton, FL, (1996), pp. 543-590.

Narula, N. et al., "zkLedger: Privacy-preserving auditing for distributed ledgers," Proceedings of the 15th USENIX Symposium on Networked Systems Design and Implementation (NSDI '18), Apr. 9-11, 2018, Renton, WA, USA, 17 pages.

Parno, B. et al., "Pinocchio: Nearly practical verifiable computation," S&P (2013), 16 pages.

Groth, J. et al., "Snarky signatures: Minimal signatures of knowledge from simulation-extractable SNARKs," In: Katz, J., Shacham, H. (eds.) CRYPTO 2017. LNCS, vol. 10402, pp. 581-612. Springer, Cham (2017).

Wu, H., "DIZK: Distributed zero-knowledge proof systems," In USENIX Security (2018), 35 pages.

Orcutt, M., "A tool developed for blockchains makes it possible to carry out a digital transaction without revealing any more Information than absolutely necessary," MIT Technology Review 121.2: 45(1). Technology Review, Inc. (Mar. 2018-Apr. 2018).

Zhang, Y. et al., "Z-Channel: Scalable and efficient scheme in zerocash," 2017, [Online], Retrieved from the Internet: https://eprint.iacr.org/2017/684, pp. 1-39.

Wang, X. et al., "STAMP: Enabling Privacy-Preserving Location Proofs for Mobile Users," IEEE/ACM Transactions on Networking, vol. 24, No. 6, Dec. 2016, pp. 3276-3289.

Kosba, A. et al., "Hawk: The Blockchain Model of Cryptography and Privacy-Preserving Smart Contracts," 2016 IEEE Symposium on Security and Privacy, May 2016, pp. 839-858.

Office Action for U.S. Appl. No. 16/848,269, dated Sep. 8, 2021, 22 pages.

Office Action for U.S. Appl. No. 16/848,506, dated Sep. 13, 2021, 8 pages.

European Commission, "Code of Conduct on Withholding Tax," [Online], Ref. Ares(2017)5654449—Nov. 20, 2017, Retrieved from the Internet: https://ec.europa.eu/taxation_customs/sites/taxation/files/code_of_conduct_on_witholding_tax.pdf, 12 pages.

European Commission, "Non-paper on the withholding tax for discussion at the Expert Group on barriers to free movement of capital," Sep. 28, 2016, https://ec.europa.eu/transparency/regexpert/index.cfm?do=groupDetail.groupDetailDoc&id=28783&no=6 (last accessed Mar. 17, 2021), 6 pages.

European Parliament, Press Release, "Cum-ex tax fraud scandal: MEPs call for inquiry, justice, and stronger tax authorities," [Online], Nov. 29, 2018, Retrieved from the Internet: https://www.europarl.europa.eu/news/en/press-room/20181120IPR19552/cum-ex-tax-fraud-meps-call-for-inquiry-justice-and-stronger-tax-authorities, 4 pages.

European Parliament Resolution of Nov. 29, 2018 on the cum-ex scandal: financial crime and loopholes in the current legal framework (2018/2900(RSP), [Online], Retrieved from the Internet: http://www.europarl.europa.eu/doceo/document/TA-8-2018-0475_EN.html, May 19, 2020, 3 pages.

International Search Report and Written Opinion for International Application No. PCT/EP2020/072325, dated Nov. 6, 2020, 11 pages.

International Search Report and Written Opinion for International Application No. PCT/US2020/061243, dated Feb. 22, 2021, 12 pages.

International Search Report and Written Opinion for International Application No. PCT/US2021/027448, dated Jul. 23, 2021, 11 pages.

ISO 20022, "A single standardisation approach (methodology, process, repository) to be used by all financial standards initiatives," May 2013, [Online], Retrieved from the Internet: https://www.iso20022.org/, 6 pages.

ISO 6166—ISIN—International Securities Identification Number, [Online], Retrieved from the Internet: https://www.isin.net/iso-6166/, Retrieved from the Internet: May 2, 2021, 9 pages.

ISO 6166:2013, "Securities and related financial instruments International securities identification numbering system (ISIN)," Jul. 2013, [Online], Retrieved from the Internet: https://www.iso.org/standard/44811.html, 3 pages.

Kyle, L., "Overview of EY Nightfall," Jun. 13, 2019, [Online], Retrieved from the Internet: https://medium.com/coinmonks/overview-of-ey-nightfall-f9e9ce21cf65, 11 pages.

Lielacher, A., "Ernst & Young Rolls Out 'Nightfall' to enable private transactions on Ethereum," Brave New Coin, Jun. 7, 2019, [Online], Retrieved from the Internet: https://bravenewcoin.com/insights/ernst-and-young-rolls-out-'nightfall-to-enable-private-transactions-on, 6 pages.

OECD (2017), "Commentary on Article 10 Concerning The Taxation on Dividends," In Model Tax Convention on Income and on Capital: Condensed Version 2017, OECD Publishing, Paris, [Online], Retrieved from the Internet: https://read.oecd-ilibrary.org/taxation/model-tax-convention-on-income-and-on-capital-condensed-version-2017_mtc_cond-2017-en, pp. 231-253.

OECD (2020), Centre for Tax Policy and Administration, Glossary of Tax Terms, "Withholding Tax," [Online], Retrieved from the Internet: https://www.oecd.org/ctp/glossaryoftaxterms.htm., 23 pages.

OECD (2020), "TRACE XML Schema: User Guide," OECD, Paris [Online], Retrieved from the Internet: http://www.oecd.org/tax/exchange-of-tax-information/trace-XML-schema-user-guide.htm, 70 pages.

OECD, "Action 13 Country-by-Country Reporting," [Online], Retrieved from the Internet: https://www.oecd.org/tax/beps/beps-actions/action13/, 7 pages.

OECD, Common Reporting Standard (CRS)—Organisation for Economic Co-operation and Development, "What is the CRS?" Jul. 15, 2014, [Online], Retrieved from the Internet: https://www.oecd.org/tax/automatic-exchange/common-reporting-standard/, 3 pages.

OECD, "TRACE Implementation Package," Jan. 23, 2013, [Online], Retrieved from the Internet: https://www.oecd.org/ctp/exchange-of-tax-information/TRACE_Implementation_Package_Website.pdf, 135 pages.

Office Action for U.S. Appl. No. 16/869,944, dated Dec. 3, 2020, 24 pages.

Office Action for U.S. Appl. No. 16/869,944, dated May 21, 2021, 22 pages.

Office Action for U.S. Appl. No. 16/952,949, dated Jun. 15, 2021, 23 pages.

Planta, F., European Securities and Markets Authority (esma), European Parliament—FISC Sub Committee on Fiscal Matters, "Public hearing on Cum/Ex and Cum/Cum scandal," Feb. 22, 2021, ESMA70-155-11890, Retrieved from the Internet: https://www.esma.europa.eu/sites/default/files/library/esma70-155-11890_statement_cumex_cumcum_scandal_-_fabrizio_planta.pdf, 3 pages.

Shahid, A. et al., "Blockchain-based agri-food supply chain: A complete solution," IEEE Access, IEEE, vol. 8, Apr. 2020, pp. 69230-69243.

Westerkamp, M. et al., "Blockchain-based supply chain traceability: Token recipes model manufacturing processes," 2018 IEEE Confs on Internet of Things, Green Computing and Communications, Cyber, Physical and Social Computing, Smart Data, Blockchain, Computer and Information Technology, Congress on Cybermatics, IEEE, Jul. 2018, pp. 1595-1602.

Elmasri, R. et al., "Fundamentals of database systems," Seventh Edition, Pearson, 2016, 1273 pages.

Office Action for U.S. Appl. No. 16/952,949, dated Sep. 30, 2021, 25 pages.

Office Action for U.S. Appl. No. 17/231,467, dated Feb. 16, 2022, 29 pages.

(56) References Cited

OTHER PUBLICATIONS

Office Action for U.S. Appl. No. 17/231,467, dated Oct. 1, 2021, 34 pages.
Entriken, W. et al., "EIP-721: Non-Fungible Token Standard," Ethereum Improvement Proposals, Jan. 24, 2018, 14 pages.
ERC-20 Token Standard, 2020, 6 pages.
EY Global, "Transforming the business lifecycle with Nightfall," YouTube, Oct. 24, 2019, 3 pages.
Konda, C., "Introduction to Nightfall—How Does it Make Token Transactions Private?," 2019, 12 pages.
Nightfall, 2019, 16 pages.
Nitulescu, A., "zk-SNARKs: A Gentle Introduction," 2022, 49 pages.
Reiff, N., "What is ERC-20 and What Does it Mean for Ethereum?," Investopedia, Jan. 26, 2022, 8 pages.
Sankaran, A., "EY launches the world's first secure private transactions over the Ethereum public blockchain," EY Press Release, EYGM Limited, Oct. 2018, London, GB, 4 pages (2018).

\* cited by examiner

METHODS AND SYSTEMS FOR ENHANCING PRIVACY AND EFFICIENCY ON DISTRIBUTED LEDGER-BASED NETWORKS

CROSS-REFERENCE TO RELATED PATENT APPLICATION

This application is a continuation of U.S. patent application Ser. No. 16/283,452, filed Feb. 22, 2019, entitled "Methods and Systems for Enhancing Privacy and Efficiency on Distributed Ledger-Based Networks," which claims priority to and the benefit of U.S. Provisional Application No. 62/719,636, filed Aug. 18, 2018, entitled "Methods and Systems of ZKP-Based Secure PE Transactions on Public Networks," and U.S. Provisional Application No. 62/748,002, filed Oct. 19, 2018, entitled "Methods and Systems of ZKP-Based Secure Private Enterprise Transactions on Public Networks," the entire contents of each of which are incorporated herein by reference in their entireties.

FIELD OF THE DISCLOSURE

Distributed ledger-based networks (DLNs) dispense with the need for a central authority to manage the operations of the networks due to their transparency and consensus-based verification mechanisms for validating actions occurring on the DLNs, which allow participants of the networks to trust the accuracy of the validations without the central authority. The transparency and consensus-based verification mechanisms, however, compromise the privacy of the actions and the involved parties, as relevant information has to be shared with at least a substantial portion of the participants of the DLNs for the actions to be validated. The instant disclosure illustrates how the privacy, efficiency and security of such actions can be enhanced with the use of zero-knowledge proofs (ZKPs) that can be used to verify the validity of at least some aspects of the actions without private information related to the actions necessarily being revealed publicly. The disclosure discloses methods and systems that are directed at providing enhanced security, efficiency and privacy to actions conducted on ZKP-enabled DLNs.

BACKGROUND

Organizations can use private networks as well as public networks such as the internet and distributed ledger-based networks (DLNs) to manage and track the production and shipping of large quantities of items or assets. The use of private networks, however, can be inefficient and costly, while public networks may not provide the desired level of privacy and/or security. For example, public DLNs can expose, by virtue of being public networks, details of private interactions occurring on the networks.

SUMMARY

Figure 1:
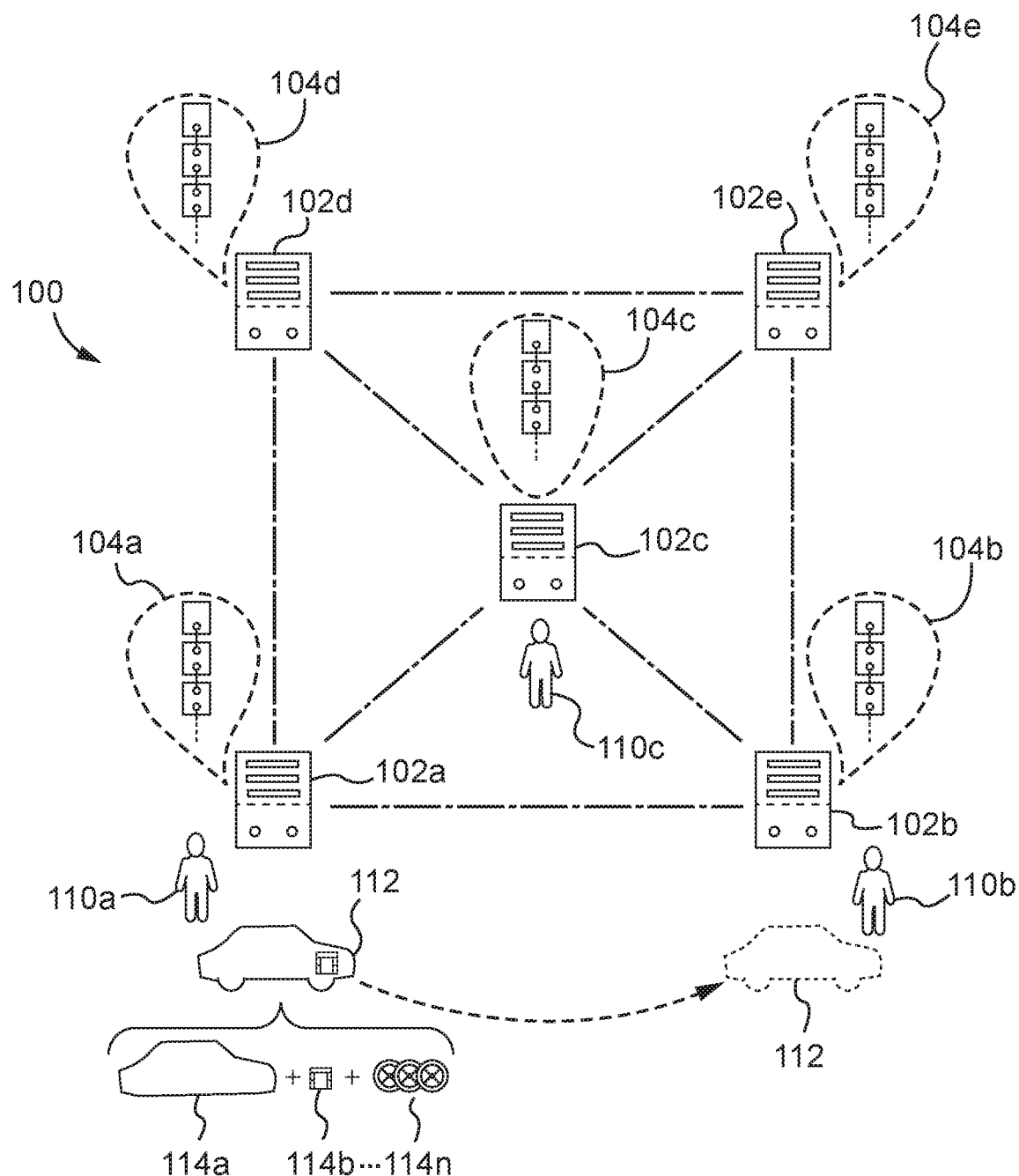
FIG. 1 shows a zero knowledge proof-enabled distributed ledger-based network configured for use in managing and conducting a private transaction between two parties that are participants of the network, according to some embodiment.

Some embodiments of the current disclosure disclose methods and systems that are directed at providing enhanced security, efficiency and privacy to actions conducted on zero knowledge proof-enabled distributed ledger-based network (ZKP-enabled DLNs). For example, the actions may include representing the transfer of an asset from a sender to a recipient, where the asset is a combined asset formed by combining a plurality of assets and is represented on the ZKP-enabled DLN by a combined asset token commitment. In such embodiments, the methods may include the steps of: receiving a request that is configured to cause a transfer of a combined asset from a sender to a recipient, the combined asset including a first asset and a second asset, the first asset and the second asset represented on a DLN by a first token commitment and a second token commitment, respectively; generating, upon receiving the request, a combined asset token that includes a combination of: 1) a first asset token obtained via an application of a first hashing function on a first identifying parameter of the first asset, and 2) a second asset token obtained via an application of a second hashing function on a second identifying parameter of the second asset; and providing, by a provider and to a self-executing code segment on the DLN, a ZKP. In some embodiments, the ZKP includes the ZKP that the provider has knowledge of an identity of: (1) the first asset token, the first token commitment obtained via an application of a third hashing function on the first asset token; (2) the second asset token, the second token commitment obtained via an application of a fourth hashing function on the second asset token; and/or (3) the combined asset token, a third token commitment representing the combined asset on the DLN obtained via an application of a fifth hashing function on the combined asset token. In some embodiments, the methods may include the step of: receiving, upon verification of the ZKP by the self-executing code segment, a confirmation confirming an addition of the third token commitment onto a commitments data structure of the DLN.

DETAILED DESCRIPTION

In some embodiments, parties participating in a transaction may elect to use a public distributed ledger-based network (DLN) to document the details of the transaction and manage its operations. DLNs can provide decentralized platforms that are transparent to at least all the participants of the networks, if not to the public at large, and as such, can be viewed as consensus-based platforms that facilitate trust between transaction participants without the need for a central authority to administer the network. For example, parties participating in a transaction for a sale of a digital music file can use a self-executing code or program (e.g., a smart contract) on the DLN (e.g., a blockchain network) to manage the sale of the music file. The self-executing code or smart contract can regulate the exchange of the music file and the correct payment for the file between the parties without involvement from a third party. In some embodiments, the DLNs can also be used to manage transactions involving physical (e.g., non-digital) assets. In some implementations, this can be accomplished by using tokens to represent the assets, and a sale of an asset can be represented by the transfer of the token representing the asset from one party (e.g., the seller) to a second party (e.g., the buyer).

In some embodiments, a DLN can be and/or support a blockchain network. Throughout the instant disclosure, in some embodiments, the terms "distributed ledger-based network" and "blockchain network" may be used interchangeably. Similarly, in some embodiments, the terms "self-executing code" or "self-executing code segment" and "smart contract" may be used interchangeably. Further, in some embodiments, the term "transaction" may be used to refer to off-chain transactions (e.g., transactions involving the sale of physical or digital assets between parties) and/or on-chain representation of these off-chain transactions (e.g., the transaction of tokens that represent the assets on the blockchain network). Whether the term refers to the former or the latter case should be clear from context. The terms "off-chain" or "off—the DLN" are to be understood to mean "not on the blockchain network" or "not on the DLN." For example, if a statement such as "the application of a hashing function is performed off—the DLN" is to be understood as meaning "the application of the hashing function is not performed on the DLN (and is performed elsewhere)".

As noted above, in some embodiments, the trust the distributed ledger-based networks provide with no need for supervision by a central authority derives from the transparency of the networks to at least all the participants of the network (and in the case of public networks, to the public at large). This transparency, however, can reduce or even eliminate any privacy or confidentiality that participants need or seek when interacting with the network or its participants. For example, in the case of public networks, any interested person can access and inspect the distributed ledgers on the networks to obtain detailed information on all transactions that are represented on the ledgers since the inception of the networks (as the ledgers are, in at least most cases, largely immutable). In some implementations, the lack of privacy or confidentiality can render the use of a public ledger-based network untenable. For instance, a pharmacy using a public blockchain network to manage the fulfillment of orders for shipment of prescription drugs without a mechanism to conceal at least some aspects of the transaction would publicly expose personal and health-related data of its customers (thereby violating their privacy and possibly health privacy laws).

In some cases, private DLNs can be used to provide participants a measure of privacy that may not be available on public networks. The privacy afforded by private (non-ZKP-enabled) DLNs, however, can be far from adequate for most purposes (how ZKPs can be used to provide privacy in private and/or public blockchain networks will be discussed in details below). For example, with reference to the above example, the personal and health-related data of customers would still be available for inspection by other members of the private non-ZKP-enabled DLN (even if the data may be hidden from the public). Further, private non-ZKP-enabled DLNs would be burdensome to maintain as, amongst other reasons, applications developed for public blockchain networks would not seamlessly interoperate on private non-ZKP-enabled blockchain networks.

The inefficiency and cost associated with private non-ZKP-enabled DLNs may be illustrated with reference to the internet, which suffers from several privacy and security-related ills due to the openness of the network to anyone capable of accessing the network. Setting up a "private" intranet network can be one way to combat the noted privacy and security-related ills. Such private networks, however, are likely to severely lag in their developments, and even then to be costly to maintain, compared to the open internet, as the closed nature of the private networks would limit interoperability of applications developed for the open or public internet. Analogously, a private DLN would lag in its development compared to a public DLN and may still be costly to maintain. One or more embodiments described herein disclose methods and systems that are directed at providing enhanced privacy, efficiency and security to DLNs via the implementation of ZKPs in the DLNs. It is to be noted that, although descriptions of these embodiments refer to public DLNs, the methods and systems equally apply to private DLNs.

In some embodiments, as noted above, the current disclosure discloses methods and systems that provide privacy to participants of a transaction on a ZKP-enabled DLN while retaining the level of trust afforded by decentralized networks (i.e., with no central authority) such as DLNs. For example, one or more of the methods and systems disclosed herein allow for the identities of parties to a transaction (e.g., a sale or transfer of an asset between the parties) as well as details of the transaction (e.g., details of the assets being transferred) to remain secret when a public blockchain network is used to manage the transaction. Referring to the example provided above, one or more of the disclosed methods and systems allow the pharmacy to use a public blockchain network to facilitate the shipment of the drugs without revealing on the blockchain network (or publicly) any identifying information related to the assets (i.e., the drugs), the sender (i.e., the pharmacy) and/or the recipient of the assets (i.e., the clients), while depending on the trust afforded by the blockchain network at least partly as a result of the transparency inherent to public blockchain networks. In such examples, the sender and the recipient may be represented by their respective public keys on the blockchain network.

In some embodiments, the methods and systems enhance the efficiency of actions represented on ZKP-enabled DLNs while still retaining the level of trust afforded by decentralized networks as noted above. In some implementations, an action may be a transaction involving the transfer of multiple assets between participants of the DLN, and the transferor may wish to combine the multiple assets into a single asset to simplify the shipping process. For example, the above-mentioned client of the pharmacist may be a clinic ordering a variety of drugs, and the pharmacist may wish to combine all the drugs into a single package before shipping to the client. In such cases, the pharmacist can tokenize the individually ordered drugs and combine the individual asset tokens (or, in some instances, the hashes of the asset tokens) to represent the combined package containing the individually ordered drugs. The pharmacist may then represent, on the ZKP-enabled DLN, the shipping of the combined package, thereby greatly increasing the efficiency of his/her operations (compared to when, for example, the pharmacist ships each ordered drug individually (and represents the shipping on the ZKP-enabled DLN separately)). That is, a user of the disclosed ZKP-enabled DLN can use the methods and systems disclosed herein to facilitate the combining of the multiple assets into a single asset prior to transferring the combined asset to a recipient, as the disclosed methods and systems allow one to represent the combined asset and its transfer on the ZKP-enabled DLN.

In some implementations, the actions may be the actions of a single participant that uses the ZKP-enabled DLN to, amongst other things, manage an inventory or a manufacturing process. For example, the DLN participant may be a vehicle manufacturer that assembles a large number of car parts (referred to as assets in this example) to produce or manufacture a vehicle. In such an example, the participant may tokenize the car parts (e.g., use asset tokens or hashes of asset tokens to identify the individual car parts) and generate a combined asset token or asset token hash to identify the manufactured (i.e., assembled) vehicle by combining the asset tokens or the asset token hashes that identify the car parts that constitute the assembled vehicle. For example, for each car part that goes into making or assembling a vehicle, the vehicle manufacturer may generate an asset token hash by hashing or applying a hashing function on one or more identifying parameters of the car part and combine the asset token hashes to form a combined asset token hash that identifies the vehicle manufactured by assembling the car parts. In some embodiments, a ZKP-enabled DLN may be used to manage the inventory of the assets (e.g., the car parts) and/or the manufacturing process to produce a combined asset (e.g., the assembling of the car parts to produce the vehicle). In some embodiments, as mentioned above, the ZKP-enabled DLN can be used to transfer the combined asset (or the individual assets, if desired) to another participant on the ZKP-enabled DLN.

FIG. 1 shows a ZKP-enabled DLN configured for use in managing and representing a private transaction between two parties that are participants of the network, in particular a public network, according to some embodiment. In some embodiments, the ZKP-enabled DLN or blockchain network 100 includes a plurality of computing nodes 102a-102e configured to communicate amongst each other via a peer-to-peer (P2P) connection. In some implementations, the computing nodes 102a-102e can be computing devices including but not limited to computers, servers, processors, data/information processing machines or systems, and/or the like, and may include data storage systems such as databases, memories (volatile and/or non-volatile), etc. In some implementations, the P2P connections may be provided by wired and/or wireless communications systems or networks such as but not limited to the internet, intranet, local area networks (LANs), wide area networks (WANs), etc., utilizing wireless communication protocols or standards such as WiFi®, LTE®, WiMAX®, and/or the like.

In some embodiments, the ZKP-enabled DLN 100 may include self-executing codes or smart contracts that are configured to execute upon fulfillment of conditions that are agreed upon between transacting parties. For example, some or all of the computing nodes 102a-102e may include copies of a self-executing code that self-execute upon fulfillment of the conditions. In some implementations, the computing nodes 102a-102e may communicate with each other to exchange the results of the executions of their respective self-executing codes so that at least a substantial number or percentage of the computing nodes 102a-102e arrive at a consensus on the results. In some implementations, one or a few of the computing nodes 102a-102e may have self-executing codes that self-execute, and the results would be transmitted to the rest of the computing nodes 102a-102e for confirmation.

In some embodiments, a self-executing code or a smart contract can facilitate the completion of transactions on the ZKP-enabled DLN 100 by providing the transacting parties confidence that the other party would deliver the promised product or payment. For example, with reference to the above example related to the sale of a digital music file, a smart contract can be used to verify that the seller of the file is in fact an owner of the file, the buyer of the music file has adequate resource to pay for the music, etc. Further, the smart contract can facilitate the exchange of the music file by allowing the transfer of a payment to occur only after the transfer of the music file is completed (and validated).

In some embodiments, the ZKP-enabled DLN 100 may be linked to one or more oracles (not shown) or data feeds that provide external data to the ZKP-enabled DLN 100. In some implementations, as discussed above, self-executing codes or smart contracts can automatically execute upon realization of some conditions of a transaction, and the oracles may provide the data that can be used to evaluate whether the conditions are met. For example, a transaction may be contingent on the price of a stock, a weather condition, etc., and an oracle may provide the requisite information to the smart contract facilitating the transaction. The smart contract, upon receiving the information, may self-execute after determining that the condition for the transaction has been fulfilled. In some embodiments, the oracles may facilitate for the smart contracts to send data out to external systems. For example, a smart contract may be configured to send out information to a smartphone when an account on the ZKP-enabled DLN 100 receives a payment, and an oracle may serve as a transit hub for the data including the information during its transmission to the smartphone.

In some embodiments, at least a substantial number of the computing nodes 102a-102e include copies of a distributed ledger 104a-104e onto which transactions that occur on the network are recorded. The recording of the transactions on the distributed ledger 104a-104e may occur when some substantial proportion of the computing nodes 102a-102e, or a subset thereof, agree on the validity of the transactions. The distributed ledger 104a-104e can be immutable or nearly immutable in the sense that to alter the distributed ledger 104a-104e, at least this substantial portion of the computing nodes 102a-102e would have to agree, which can be increasingly difficult when the number of computing nodes 102a-102e is large (and the distributed ledger 104a-104e gets longer).

As noted above, the ZKP-enabled DLN 100 can be used to facilitate transactions that involve digital assets (e.g., sale of digital music files). In some embodiments, the ZKP-enabled DLN 100 can also be used to facilitate transactions of assets that occur off-chain or off-line (e.g., transactions of physical assets) such as, but not limited to, the aforementioned selling of drugs by a pharmacy or a vehicle by a car manufacturer. In some implementations, off-chain assets can be represented by tokens (e.g., token commitments) on the ZKP-enabled DLN 100, and the sale or transfer of the off-chain assets can be represented on the ZKP-enabled DLN 100 by the transfer of the tokens between the blockchain accounts of the transacting parties. In some implementations, the types of tokens used to represent the off-chain assets can depend on the nature of the assets themselves. For example, fungible products (e.g., some amount of gasoline or a currency) can be represented with fungible tokens while non-fungible products (e.g., distinguishable products such as a product with a serial number) can be represented by non-fungible tokens. FIG. 1 shows an example embodiment of a transaction that involves the sale of an off-chain asset (e.g., vehicle 112) from a first transaction participant 110a to a second transaction participant 110b. In such example, the vehicle may be represented on the ZKP-enabled DLN 100 with a non-fungible token that can be transferred from the first transaction participant 110a to the second transaction participant 110b to represent the sale or transfer of the vehicle 112 during the transaction between the two parties. In some embodiments, tokens may be stored off-chain, i.e., off of the ZKP-enabled DLN 100. For example, tokens may be stored in storage systems or databases that are linked with the ZKP-enabled DLN 100. For instance, if the ZKP-enabled DLN 100 is a ZKP-enabled Ethereum blockchain network, the tokens may be stored in the Swarm database. In some embodiments, the tokens may be stored on the ZKP-enabled DLN 100 (e.g., in the storage systems associated with the computing nodes 102a-102e).

In some embodiments, as noted above, transactions that occur on the ZKP-enabled DLN 100 (including off-chain transactions that are represented on the ZKP-enabled DLN 100 with the use of tokens, for example) are recorded onto at least a substantial number of the distributed ledgers 104a-104e that exist on the ZKP-enabled DLN 100. For example, a transaction between a first transaction participant 110a and a second transaction participant 110b on the ZKP-enabled DLN 100 representing the transfer of an off-chain asset 112 from the former to the latter would be recorded on all or nearly all of the distributed ledgers 104a-104e once the transaction details are accepted as valid by the participants of the ZKP-enabled DLN 100. In the case of a blockchain network that is not ZKP-enabled, however, the first transaction participant 110a and the second transaction participant 110b are afforded little or no privacy as all or nearly all the details of the transaction are made public or visible to all that have access to the blockchain network (the public, in case of public blockchains), such details including confidential information on the transacting participants, the asset being transacted, the tokens used to represent the asset and its transfer on the blockchain network, and/or the like. In some embodiments, the present disclosure discloses methods and systems directed at providing privacy and efficiency to transactions that occur, or are represented on public blockchains, with the use of zero knowledge proofs (ZKPs).

In some embodiments, the off-chain asset 112 may have to be assembled by the first transaction participant 110a from multiple assets 114a-114n (e.g., asset parts) before being transferred to the second transaction participant 110b. For example, the first transaction participant 110a may be a vehicle manufacturer that received an order for a vehicle and the manufacturer may assemble the multiple assets 114a-114n to produce the asset 112 (i.e., vehicle). In some embodiments, the first transaction participant 110a may represent each asset part 114a-114n on the ZKP-enabled DLN 100 using a token, and further represent the assembling of the multiple assets 114a-114n into the asset 112 by combining the tokens into a combined token that represents the asset 112 on the ZKP-enabled DLN 100. In some instances, the tokens representing the part assets 114a-114n and/or the combined token may be generated on the ZKP-enabled DLN 100. In some implementations, the first transaction participant 110a may represent the transfer of the asset 112 to the second transaction participant 110b by transferring the combined token to the second transaction participant 110b as described above. In some embodiments, the generation of the tokens and the combined token, on the ZKP-enabled DLN 100, to represent the multiple assets 114a-114n and the asset 112, respectively, may be accomplished with the use of ZKPs to enhance the privacy and efficiency of the assembly process to produce the asset 112. Further, in some embodiments, the transfer, on the ZKP-enabled DLN 100, of the combined token to represent the transfer of the physical asset 112 may also be accomplished with the use of ZKPs to enhance the privacy and efficiency of the asset transfer process. For example, the use of ZKPs in such embodiments allows the first transaction participant 110a to keep as secret some or all of the details related to the multiple assets 114a-114n, the asset 112, the first transaction participant 110a, the second transaction participant 110b, and/or the like (thereby significantly enhancing the privacy level afforded to participants of the ZKP-enabled DLN 100).

In some embodiments, ZKPs can be used by a first entity, the "prover" of the proofs, to convince a second entity, the "verifier" of the proofs, that a statement about some secret information is truthful without having to reveal the secret information to the verifier. ZKPs can be interactive, i.e., require interaction from the prover for the verifier to verify the truthfulness of the statement. In some embodiments, the ZKPs can be non-interactive, requiring no further interaction from the prover for the verifier to verify the statement. Examples of non-interactive ZKPs include zero-knowledge succinct non-interactive argument of knowledge (zk-SNARK), zero-knowledge scalable transparent argument of knowledge (zk-STARK), etc. Discussions of ZKPs, zk-SNARK, zk-STARK, etc., can be found in U.S. Patent Publication No. 2011/0246779, which is incorporated by reference herein in its entirety.

Figure 2:
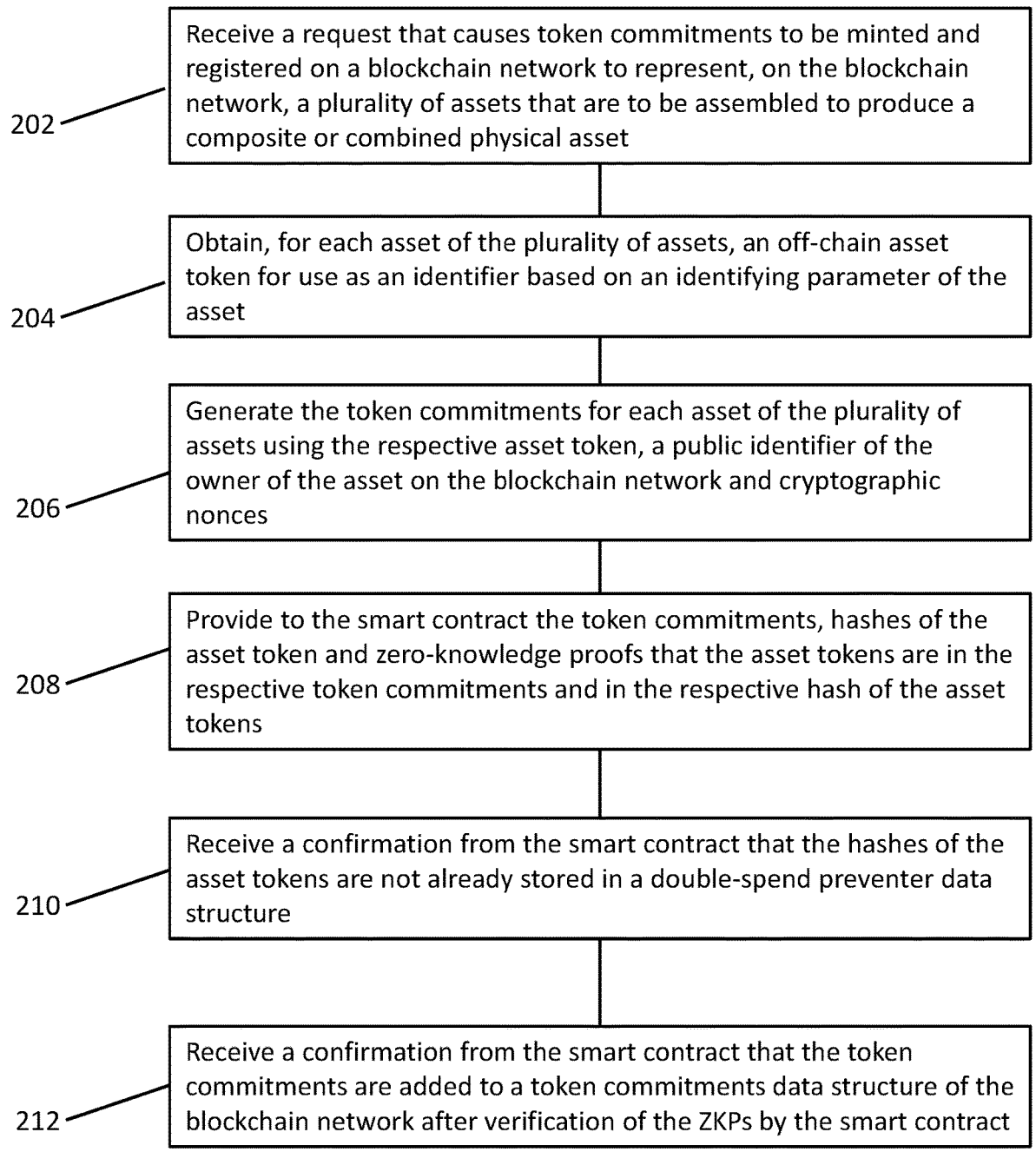
FIG. 2 shows a flow chart illustrating the minting and combining of multiple tokens on a distributed ledger-based network to represent a real world or physical asset on the distributed ledger-based network, the real-world or physical asset formed from a combination of multiple physical assets, according to some embodiment.

FIG. 2 shows a flow chart illustrating the steps of minting token commitments on a distributed ledger to represent real world or physical assets on the ZKP-enabled DLN 100, according to some embodiment. In particular, a composite or assembled asset 112 may include constituent assets 114a-114n that are combined together to form or produce the asset 112, and in some embodiments, a token commitment for each constituent asset 114a-114n may be generated to represent the assets 114a-114n on the ZKP-enabled DLN 100. As will be discussed in more details below, token commitments can be viewed as tokens that represent assets on the ZKP-enabled DLN 100 while encoding information about the ownership of the assets. In some implementations, token commitments represent assets on the ZKP-enabled DLN 100 by also including or encoding information that relates to the asset. For example, token commitments can be tokens that include or encode asset and/or owner identifiers, and the addition of the token commitments onto a commitments data structure of the ZKP-enabled DLN 100 may be viewed as a registration of the asset (and its ownership) on the ZKP-enabled DLN 100.

In some implementations, to represent the constituent (non-fungible) assets 114a-114n on the ZKP-enabled DLN 100, the first transaction participant 110a (referred hereinafter as the sender 110a) may generate, at 204 and using the computing node 102a, an asset identifier for each constituent asset 114a-114n that can serve as a unique identifier for the constituent asset while concealing the constituent asset's identity. In some implementations, the constituent asset identifiers may be generated in response to a request, at 202, to have the constituent assets 114a-114n represented on the ZKP-enabled DLN 100. For example, the sender 110a can generate, using the computing node 102a and for each asset of the constituent assets 114a-114n, an alpha-numeric value that is uniquely associated with some identifying parameters (e.g., serial numbers, model numbers, etc.) of that constituent asset, and the alpha-numeric value can be used as the asset identifier that hides the real identity of that constituent asset (while still being used by the sender 110a as an identifier of that constituent asset). As another example, a unique asset identifier can be generated for each constituent asset 114a-114n by cryptographically hashing the identifying parameters of that constituent asset to generate an asset token that can serve as the unique asset identifier. In some instances, the identifying parameter can uniquely identify a constituent asset because the constituent asset may be a non-fungible asset. The cryptographic hashing may include the application of a cryptographic hashing algorithm such as, but not limited to, the SHA-256 algorithm, on the identifying parameters. For instance, an asset token can be generated for one or more of the vehicle frame 114a, a car engine 114b and/or the vehicle tires 114n by applying a hashing function (e.g., SHA-256) on one or more of the identifying parameters of each constituent asset, including serial number(s) of the vehicle frame, engine numbers, tire identification numbers, etc. Accordingly, the asset tokens can serve as unique asset identifiers for the respective constituent assets without exposing or revealing to other participants of the ZKP-enabled DLN 100 any of the identifying parameters of the constituent assets. In some embodiments, the hashing can occur off the ZKP-enabled DLN 100. For example, if the ZKP-enabled DLN 100 is a ZKP-enabled Ethereum blockchain network, in some implementations, the asset tokens can be generated and stored off the Ethereum blockchain network at the Swarm storage network/database.

At 206, as mentioned above, off-chain non-fungible assets (e.g., the constituent assets 114a-114n) can be registered or represented on the ZKP-enabled DLN 100 for the first time by generating or minting non-fungible token commitments that encode at least some aspects of the non-fungible assets and/or the ownership of the assets on the ZKP-enabled DLN 100. In some embodiments, minting of a token commitment may refer to the registration or representation of an asset on the ZKP-enabled DLN 100 by a token commitment for the first time. As will be discussed below, new token commitments may be generated later to represent an asset that is already being represented on the ZKP-enabled DLN 100 by an existing token commitment. In such cases, however, the asset is being transferred to a new owner, and the generation of the new token commitment may be (in some cases, should be) accompanied by the nullification of the existing token commitment (which indicates that the asset does not belong to the initial owner anymore). In any case, whether an asset (e.g., non-fungible asset) is being registered or represented on the ZKP-enabled DLN 100 for the first time by the minting of a token commitment or the transfer of the asset from one owner to another is being registered on the ZKP-enabled DLN 100 by generation of a new token commitment, the minted token commitment and/or the new token commitment may encode at least some aspects of the asset and/or the ownership of the asset. To encode the aspects of the non-fungible asset (e.g., constituent assets 114a-114n), in some implementations, a cryptographic hashing function or algorithm can be applied to the unique asset identifier of the asset such as the asset token that itself was obtained via an application of a hashing function on the identifying parameters of the non-fungible asset, as discussed in the examples above. Further, to encode some aspects of the ownership of the asset, in some implementations, the cryptographic hashing function can also be applied to a public identifier on the ZKP-enabled DLN 100 that is associated with the owner (e.g., sender 110a when the sender 110a is minting the token commitment for the first time). An example of such public identifier includes the public key of the sender on the ZKP-enabled DLN 100 (e.g., the public key that is associated with the sender 110a on the ZKP-enabled DLN 100).

In some embodiments, the cryptographic hashing function can also be applied to a cryptographic nonce such as, but not limited to, a random or serial number that is securely generated and used, at least in most cases, only once. In some implementations, the cryptographic nonce can be used as a handle of the non-fungible token commitment independent of the non-fungible asset (e.g., encoded by the asset token) and/or its ownership (e.g., encoded by the public key). For example, as discussed below, the transfer of a physical asset to the recipient 110b can be represented by the generation and registration on the ZKP-enabled DLN 100 of a new token commitment that associates the asset with the new owner, the recipient 110b, and the nullification of the existing token commitment that associated the asset (or constituent assets that made up the asset) with the sender 110a. In such implementations, the token commitment handle, the cryptographic nonce, can be used to nullify the existing token commitment, as discussed below.

In some embodiments, the minting of non-fungible token commitments to represent the constituent assets 114a-114n on the ZKP-enabled DLN 100 for the first time may include the computation of token commitments (Z-tokens) as follows: $Z_i = H(S_i \oplus P_k \oplus A_i)$, where $A_i$ is the asset token identifying one of the constituent assets 114a-114n (e.g., the asset tokens obtained by hashing, off-chain, at least some identifying parameters of the constituent assets 114a-114n), i stands for the $i^{th}$ constituent asset 114a-114n, $P_k$ is the public key on the ZKP-enabled DLN 100 that is associated with the sender 110a (e.g., the current owner of the constituent assets 114a-114n), $S_i$ is a cryptographic nonce, H is a cryptographic hashing function or algorithm (e.g., SHA-256), and $\oplus$ represents a combining operator (e.g., the XOR operator $\oplus$, the concatenation operator |, etc.). In some embodiments, the computation of the token commitment $Z_i$ may include application of the hashing function on additional elements besides or instead of $S_i$, $P_k$ and $A_i$. In some embodiments, the token commitment $Z_i$ comprises or consists of a cryptographic nonce (e.g., a securely and randomly generated serial number), a public identifier on the ZKP-enabled DLN 100 of the sender 110a (e.g., public key of the sender 110a) and an asset identifier (e.g., asset token $A_i$). In some embodiments, the application of the hashing function to compute the Z-tokens (i.e., token commitments) allows for the generation or construction of the non-fungible tokens (e.g., Z-tokens or token commitments) without revealing the identities of the cryptographic nonces $S_i$ and/or the asset tokens $A_i$ on the ZKP-enabled DLN 100 (e.g., $S_i$ and $A_i$ may be kept secret by the sender 110a, except when $A_i$ is transmitted (privately) to the recipient 110b as discussed below during an asset transfer transaction). Throughout this disclosure, discussions about an $i^{th}$ constituent asset, such as discussions related to the asset token $A_i$, the token commitment $Z_i$, cryptographic nonce $S_i$, etc., equally apply to all the constituent assets 114a-114n, unless explicitly disclaimed otherwise or is clear from context. For example, a discussion related to the token commitment $Z_i$ comprising the asset token $A_i$ is to be understood as a plurality of token commitments $Z_1, Z_2, \ldots, Z_n$ comprising the asset tokens $A_1, A_2, \ldots, A_n$, respectively, corresponding to the constituent assets 114a-114n.

After the token commitment $Z_i$ is computed, at 208, the sender 110a may provide or publish, anonymously and using the computing node 102a, the Z-token $Z_i$ and/or a hash of the asset token $A_i$, $H(A_i)$, to a self-executing code or smart contract on the ZKP-enabled DLN 100 to have the token commitment (i.e., Z-token) minted or registered for the first time on the ZKP-enabled DLN 100. Prior to the set of Z-tokens $Z_1, Z_2, \ldots, Z_n$ being included in the token commitments data structure of the ZKP-enabled DLN 100 as a representation of the constituent assets 114a-114n on the ZKP-enabled DLN 100, however, the sender 110a may have to demonstrate to the ZKP-enabled DLN 100 (e.g., to the smart contract of the ZKP-enabled DLN 100) that (1) the Z-token $Z_i$ in fact includes the asset token $A_i$, and/or (2) the constituent assets 114a-114n are not already represented on the ZKP-enabled DLN 100, i.e., the Z-tokens $Z_1, Z_2, \ldots, Z_n$ have not already been minted for the constituent assets 114a-114n on the ZKP-enabled DLN 100 (e.g., to avoid "double minting," which can lead to undesirable "double spend" or "double transfer" on the ZKP-enabled DLN 100 of multiple token commitments all representing the same constituent asset), according to some embodiments. In some implementations, the sender 110a may generate and provide anonymously to the smart contract, using the computing node 102a, a ZKP that the Z-token $Z_i$ includes the asset token $A_i$. Further, the ZKP may also include a proof that a hash of the asset token $A_i$, $H(A_i)$, includes the asset token $A_i$. In some implementations, the hash $H(A_i)$ can be used by the smart contract to verify that the asset identified by the asset token $A_i$ is not already represented on the ZKP-enabled DLN 100. That is, as discussed below, $H(A_i)$ can be used to prevent undesirable "double spend" by prohibiting a future attempt to mint or register a new token commitment for the constituent asset 114a-114n identified by the asset token $A_i$ while another valid token commitment for the same constituent asset 114a-114n exists on the ZKP-enabled DLN 100. In other words, in some embodiments, $H(A_i)$ can be used to prevent the minting of a new token commitment to represent the assets on the ZKP-enabled DLN 100 purportedly for the first time if there is an existing token commitment representing, on the ZKP-enabled DLN 100, the asset identified by the asset token $A_i$.

In some embodiments, if a token commitment (Z-token) representing an asset (e.g., as identified by an asset token A) already exists on the ZKP-enabled DLN 100, then a new token commitment Z' representing the same asset or a combined asset that comprises the same asset can be generated on the ZKP-enabled DLN 100 only upon the nullification or invalidation of the existing token commitment Z, as discussed below (by nullified or invalidated, in some embodiments, it is meant, without limitations, that the existing token commitment is no longer valid to represent the asset on the DLN 100 (e.g., the smart contract would reject the token commitment if it were provided to it as a representation of the asset)). In other words, no two token commitments, each including an asset token that identifies the same asset, can represent the same asset on the ZKP-enabled DLN 100 at the same time.

As a specific example, if the constituent asset 114b is a vehicle engine and the vehicle engine has already been represented on the ZKP-enabled DLN 100, e.g., an asset token $A_{VE}$ has been minted or generated based on identifying parameters of the vehicle engine and a token commitment $Z_{VE}=H(S_{VE} \oplus P_k \oplus A_{VE})$ has been added onto a commitments data structure of the ZKP-enabled DLN 100 (to signify the registration of the vehicle engine on the ZKP-enabled DLN 100), then the smart contract may use $H(A_{VE})$ to make sure that no other token commitment purporting to include $A_{VE}$ and represent the vehicle engine may be added onto the commitments data structure. For example, the smart contract may inspect a double-spend preventer data structure on the ZKP-enabled DLN 100 for the presence of $H(A_{VE})$, and if the hash is present (which corresponds to the token commitment $Z_{VE}$ being on the commitments data structure), then the smart contract may not allow any other token commitment that includes $A_{VE}$ to be added into the commitments data structure as that would represent a prohibited double minting of an asset. In some instances, the new token commitment can be added into the commitments data structure if the existing token commitment $Z_{VE}$ is nullified, as discussed below (e.g., corresponding to the transfer of the asset from one participant of the ZKP-enabled DLN 100 to another).

In some embodiments, the sender 110a, using the computing node 102a, provides the ZKP to the smart contract without having revealed $A_i$ to the ZKP-enabled DLN 100 (e.g., without exposing $A_i$ to the participants of the blockchain network), thereby protecting the identity of the physical constituent assets 114a-114n that are being assembled into the asset 112. The hashing of the asset token $A_i$ also allows the sender 110a to hide the identity of the asset token $A_i$ (and hence the constituent assets 114a-114n identified by the asset tokens) from the ZKP-enabled DLN 100 or the smart contract (and hence from the other participants on the ZKP-enabled DLN 100).

Upon receiving the token commitment $Z_i$, the hash of the asset token, $H(A_i)$, and/or the ZKPs, in some embodiments, the self-executing code or smart contract may verify the ZKPs. For example, the smart contract may obtain or retrieve a public input and/or a verification key (e.g., from the sender 110a) and compute the ZKPs to verify statements included in the ZKPs, such as the statements that $H(A_i)$ includes $A_i$ (i.e., the statement that $H(A_i)$ is obtained by applying a hashing function or algorithm on the asset tokens $A_i$) and the statement that the token commitment $Z_i$ also includes $A_i$ (i.e., the statement that $Z_i$ is obtained by applying a hashing function or algorithm on the asset token $A_i$). Further, the smart contract may verify that there has never been an $H(A_i)$ provided to the smart contract previously (e.g., if the asset has never been represented on the ZKP-enabled DLN 100). For example, at 210, the ZKP-enabled DLN 100 may include a double-spend preventer data structure that includes all the hashes of asset tokens that have been provided to the smart contract previously. In such embodiments, the smart contract may check the double-spend preventer data structure for the presence of a hash of the asset token $A_i$, and if there is an $H(A_i)$ in the double-spend preventer data structure, this may be understood as the asset identified off-chain by the asset token $A_i$ has already been minted or registered on the ZKP-enabled DLN 100, and as such, the smart contract may reject the token commitment $Z_i$ provided by the sender 110a, and prevent its inclusion or addition into a commitments data structure on the ZKP-enabled DLN 100. In some embodiments, the commitments data structure includes token commitments that were added into the commitments data structure after the smart contract verifies that the double-spend preventer data structure does not contain the hashes of the asset tokens included in the token commitments (e.g., after the smart contract verifies that H(A) is not included in the double-spend preventer data structure). As such, the double-spend preventer data structure can be used to prevent the undesirable problem of "double minting" or "double spend," where a user of the ZKP-enabled DLN 100 may mint or generate two (or in general, multiple) token commitments $Z_n=H(S_n \oplus P_k \oplus A)$ for a single asset identified by A, and attempt to transfer the two (or multiple) $Z_n$ to different entities (which is what a "double spend" is, since there is only a single underlying asset for the multiple transfers). Once there is a H(A) in the double-spend preventer data structure, in some implementations, the smart contract would not allow adding, into the commitments data structure, a new token commitment representing the asset identified by the asset token A. That is, the smart contract would not allow the registration of a new token commitment $Z=H(S \otimes P_k \otimes A)$ on the ZKP-enabled DLN 100 for an asset identified by the asset token A if H(A) is present in the double-spend preventer data structure. In some embodiments, the double-spend preventer data structure and/or the commitments data structure may be stored on the ZKP-enabled DLN 100 (e.g., these data structures may be stored on storage systems that are linked to or part of the computing nodes 102*a*-102*e* that make up the ZKP-enabled DLN 100). As noted above, the combining operator $\otimes$ may include the XOR operator $\oplus$, the concatenation operator |, and/or the like.

In some embodiments, the smart contract may discover that the hash of the asset tokens $A_i$, $H(A_i)$, is not in the double-spend preventer data structure. In such embodiments, the smart contract may add $H(A_i)$ into double-spend preventer data structure and allow the addition of the token commitment $Z_i$ into the commitments data structure on the ZKP-enabled DLN 100. The addition of the token commitment $Z_i$ into the commitments data structure, at 212, may signify the representation or registration of the asset on the ZKP-enabled DLN 100. Further, since the token commitment $Z_i$ include an identifier (e.g., a public identifier) of the sender 110*a* on the ZKP-enabled DLN 100 (e.g., public key of the sender 110*a*), in some implementations, the token commitment $Z_i$ can also serve as a notice or a record of the ownership of the asset (e.g., ownership belonging to the entity that is behind the public key on the ZKP-enabled DLN 100, i.e., the sender 110*a*). It is to be noted, however, that, in some embodiments, other participants on the ZKP-enabled DLN 100 may not be privy to $A_i$ and/or the constituent assets 114*a*-114*n* represented by the set of $A_i$ (e.g., the other participants may not be privy to the identity of the constituent assets) and/or the owner/sender 110*a* of the assets. That is, the privacy of the sender 110*a* (as it relates to ownership and the identity of the assets, for example) can be protected as a result of the use of ZKP in the methods and systems disclosed herein.

Figure 3:
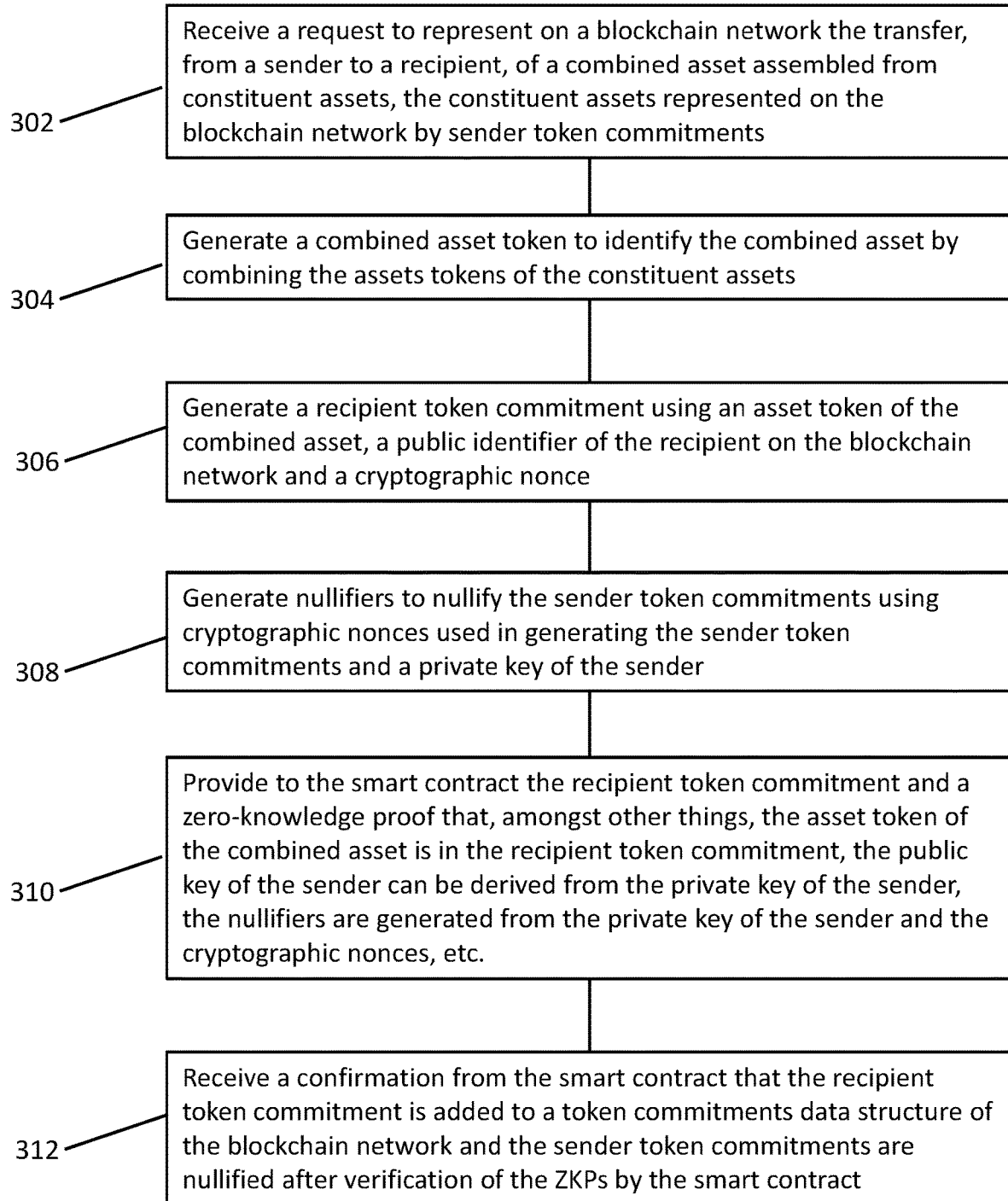
FIG. 3 shows a flow chart illustrating the creation or generation of new token commitments on the distributed ledger-based network to represent the transfer of a real-world or physical asset from a sender to a recipient, the real-world or physical asset formed by combining multiple physical assets, according to some embodiment.

FIG. 3 shows a flow chart illustrating the generation of a new token commitment on the ZKP-enabled DLN 100 to represent the transfer of a real-world or physical asset from a sender to a recipient, according to some embodiment. In some embodiments, the asset to be transferred may be assembled from multiple constituent assets, and at 302, a request may be received for the assembled or combined asset to be transferred from the sender 110*a* to the recipient 110*b* (and for the transfer to be represented on the ZKP-enabled DLN 100, for example). For example, the recipient 110*b* may send a request for a pharmacy (i.e., the sender 110*a*) to ship multiple drug prescriptions (e.g., the constituent assets), and the pharmacy may choose to combine the multiple prescriptions into one package (e.g., the combined asset) before shipping to the recipient 110*b*. With reference to FIG. 1, in some implementations, a request may be a request for a combined asset 112 that includes the constituent assets 114*a*-114*n*. In such implementations, and as discussed above, the sender 110*a* may generate, using the computing node 102*a* and for each asset of the constituent assets 114*a*-114*n*, a unique asset identifier by cryptographically hashing (e.g., using the SHA-256 algorithm) the identifying parameters of the constituent asset to generate an asset token A that can serve as the unique asset identifier. For example, if the request is for the shipment of a vehicle (combined asset 112), the sender 110*a* may generate asset tokens $A_i$ for each of the constituent assets 114*a*-114*n* (denoted by i) by cryptographically hashing the identifying parameters of the constituent assets 114*a*-114*n* (e.g., the asset token for the engine 114*b* may be generated by cryptographically hashing, amongst other things, the engine number of the engine 114*b*). In some embodiments, at 304, a combined asset token B that identifies the combined or assembled asset may be generated based on the asset tokens $A_i$ of the constituent assets. For example, the combined asset token B may be generated by combining the asset tokens $A_i$. In some instances, the combined asset token B may be generated by combining the asset tokens $A_i$ as follows: $B = A_1 \otimes A_2 \otimes \ldots A_n$, where $\otimes$ represents a combining operator (e.g., the XOR operator $\oplus$, the concatenation operator |, etc.). In some embodiments, the combined asset token B and/or the constituent asset tokens $A_i$ may be generated and stored off-chain, i.e., off of the ZKP-enabled DLN 100. For example, the tokens may be generated and stored in storage systems or databases that are linked with the ZKP-enabled DLN 100. For instance, if the ZKP-enabled DLN 100 is a ZKP-enabled Ethereum blockchain network, the tokens may be generated and stored in the Swarm database.

Further, as discussed in details above with reference to FIG. 1, assets identified by an asset token A can be represented on the ZKP-enabled DLN 100 by the addition, into a commitments data structure of the ZKP-enabled DLN 100, of a token commitment Z that includes the asset token A. For example, the constituent assets 114*a*-114*n* can be represented on the ZKP-enabled DLN 100 by the addition of the constituent asset token commitments (Z-tokens) generated as follows: $Z_i = H(S_i \otimes P_k \otimes A_i)$, where $A_i$ are the asset tokens identifying the constituent assets 114*a*-114*n*, i stands for the $i^{th}$ constituent asset 114*a*-114*n*, $P_k$ is the public key on the ZKP-enabled DLN 100 that is associated with the sender 110*a*, $S_i$ are cryptographic nonces, and H is a cryptographic hashing function or algorithm (e.g., SHA-256). As noted above, throughout this disclosure, discussions about a constituent asset i, such as discussions related to the asset token $A_i$, the token commitment $Z_i$, cryptographic nonce $S_i$, etc., equally apply to all the constituent assets 114*a*-114*n*, unless explicitly disclaimed otherwise or is clear from context.

As discussed previously, the transfer of an asset from a sender to a recipient may generally be represented on the ZKP-enabled DLN 100 by the generation of a new recipient token commitment that assigns ownership of the asset to the recipient, and the nullification of the existing token commitment(s) that assigned ownership of the asset or its constituent assets to the sender. In embodiments where the asset being transferred is assembled or combined, such as the transfer of the combined asset 112 from the sender 110*a* to the recipient 110*b*, a recipient token commitment Z' that includes the combined asset token B and assigns ownership of the asset 112 to the recipient 110*b* may be generated and registered on the ZKP-enabled DLN 100 (e.g., added to a commitments data structure on the ZKP-enabled DLN 100) to represent the combined asset 112 on the ZKP-enabled DLN 100. Further, in some embodiments, the constituent asset token commitments $Z_i$ may have to be nullified or invalidated on the ZKP-enabled DLN 100 to avoid double-spend (e.g., otherwise, the sender 110*a* can generate a new token commitment Z" assigning ownership of the asset 112 to a new recipient 110*c* (and transfer Z" to the a new recipient 110*c*), even though the recipient token commitment Z' has already been transferred to recipient 110*b*). In some implementations, the sender 110a would be able to accomplish this because the sender 110a can have a smart contract in the ZKP-enabled DLN 100 execute such that the sender 110a appears to own the constituent assets 114a-114n (if the constituent asset token commitments $Z_i$ are not nullified).

In some embodiments, at 306, to represent the combined asset 112 identified by the asset token B, the recipient token commitment Z' can be generated by an application of a hashing function or algorithm on the combined asset token B. Further, the hashing function or algorithm can be applied to an identifier (e.g., public identifier) of the recipient 110b to encode the new ownership of the asset 112 (to the recipient 110b) in the recipient token commitment Z'. An example of such identifier includes the public key of the recipient 110b on the ZKP-enabled DLN 100. In addition, in some implementations, the hashing function may also be applied on a cryptographic nonce for reasons discussed above (e.g., as a handle on the recipient token commitment Z'; for example, for use in generating nullifiers as discussed below). In some implementations, the cryptographic nonce used to generate the sender token commitment Z may be different from the cryptographic nonce that would be used to generate the recipient token commitment.

An example implementation of the generation of a non-fungible recipient token commitment to represent the combined asset 112 as discussed above can include the computation of a recipient token commitment (Z'-token) as follows: $Z'=H(S' \otimes P_k' \otimes B)$, where B is the combined asset token identifying the combined asset 112 and obtained by combining the constituent asset tokens $A_i$ (e.g., $B=A_1 \otimes A_2 \otimes \ldots A_n$), $P_k'$ is the public key on the ZKP-enabled DLN 100 that is associated with the recipient 110b, S' is a cryptographic nonce, H is a cryptographic hashing function or algorithm (e.g., SHA-256), and $\otimes$ represents a combining operator (e.g., the XOR operator $\oplus$, the concatenation operator |, etc.). In some embodiments, S' may be different from $S_i$ (the cryptographic nonce used in generating the constituent asset token commitment $Z_i$). In some embodiments, the computation of the recipient token commitment Z' may include application of the hashing function on additional elements besides or instead of S', $P_k'$ and B. In some embodiments, the recipient token commitment Z' may comprise or consist S', $P_k'$ and B. In some embodiments, the recipient token commitment Z' may be generated by the sender 110a and provided, via the computing node 102a, to the smart contract of the ZKP-enabled DLN 100 anonymously. Further, the sender 110a may secretly provide the recipient 110b the cryptographic nonce S', the combined asset token B, and/or the constituent asset token $A_i$ (e.g., without divulging or revealing S', B and/or $A_i$ to the ZKP-enabled DLN 100 (e.g., to the public or the other participants of the ZKP-enabled DLN 100)).

In some embodiments, the sender 110a may provide (e.g., anonymously) to the smart contract the recipient token commitment Z' and/or the hash of the combined asset token B, H(B), for addition into the commitments data structure and the double-spend preventer data structure, respectively, of the ZKP-enabled DLN 100. In some implementations, the hashing of the combined asset token B allows the sender 110a to hide the identity of the combined asset token B (and consequently, the combined asset 112 identified by the combined asset token B) from the other participants of the ZKP-enabled DLN 100, such as participant 110c, thereby enhancing the privacy and security of the transaction involving the transfer of the combined asset 112 between the sender 110a and the recipient 110b. As discussed elsewhere in detail, the addition of H(B) into the double-spend preventer data structure would aid in preventing the double-minting (and consequently the double spending) of new combined asset token to identify the same underlying asset (that is identified by the combined asset token B), as the smart contract would not allow new token commitments to be added into the commitments data structure if there is an existing H(B) in the double-spend preventer data structure.

Before the smart contract can allow the addition of the recipient token commitment Z' and/or the hash of the combined asset token B, H(B), onto the commitments data structure and/or the double-spend preventer data structure, respectively, thereby representing the passing of the ownership of the combined asset 112 on the ZKP-enabled DLN 100 from the sender 110a to the recipient 110b, in some embodiments, the sender 110a may have to demonstrate to the smart contract the fulfillment of several conditions. For example, the sender 110a would have to demonstrate, amongst other things, that the constituent asset token commitments $Z_i$ belong to the sender 110a (signifying that the constituent assets 114a-114n belong to the sender 110a and as such the combined asset 112, formed by assembling or combining the constituent assets 114a-114n belongs to the sender 110a). Further, the sender 110a would have to demonstrate to the smart contract that the recipient token commitment Z', representing the same combined asset 112 but assigning ownership to the recipient 110b, has been generated and that the constituent asset token commitments $Z_i$ have been nullified or invalidated. These various demonstrations are described below.

In some embodiments, to demonstrate to the smart contract that the constituent asset token commitment $Z_i$ belongs to the sender 110a (which indicates the sender's 110a ownership of the constituent assets 114a-114n that were combined to form the asset 112 that is being transferred from sender 110a to recipient 110b), the sender 110a can provide the smart contract anonymously a ZKP that the sender 110a knows that the constituent asset token commitment $Z_i$ is obtained by an application of a hashing function on a combination of a cryptographic nonce, an asset identifier of the asset represented on the ZKP-enabled DLN 100 by $Z_i$ (e.g., an asset identifier such as the asset token $A_i$) and/or an identifier associated with the sender 110a on the ZKP-enabled DLN 100 such as but not limited to a public identifier (e.g., public key). For example, the ZKP can include a proof that the sender 110a has knowledge that $Z_i$ is obtained by applying a hashing function or algorithm on a combination of a cryptographic nonce $S_i$, an asset token $A_i$ that can be used as an identifier of the respective constituent asset 114a-114n, and/or the public key of the sender 110a on the ZKP-enabled DLN 100. As a specific example, the ZKP can include a proof that $Z_i$, where i stands for the $i^{th}$ constituent asset 114a-114n, is obtained by the computation $H(S_i \otimes P_k \otimes A_i)$, where the combining operator $\otimes$ may include the XOR operator $\oplus$, the concatenation operator |, and/or the like.

In some embodiments, providing a proof that the sender 110a knows that the constituent asset token commitment $Z_i$ is obtained by an application of a hashing function on a combination of a cryptographic nonce, an asset identifier of the constituent asset and/or an identifier associated with the sender 110a on the ZKP-enabled DLN 100 may not be sufficient as a proof that the constituent asset token commitment $Z_i$ belongs to the sender 110a, since there could be other participants of the ZKP-enabled DLN 100 that can have the stated information. For example, in some embodiments, one or more of the constituent assets 114a-114n may not have been minted or represented on the ZKP-enabled DLN 100 initially by the sender 110a, but rather by a prior owner or sender (not shown) that then transferred the one or more of the constituent assets 114a-114n to the sender 110a. In such cases, the prior sender may have been the one that generated the asset token $A_i$ (off-chain, for example) and represented the transfer of the one or more of the constituent assets 114a-114n from the prior sender to the sender 110a on the ZKP-enabled DLN 100 by having the smart contract on the ZKP-enabled DLN 100 add the token commitment $Z_i = H(S_i \circledast P_k \circledast A_i)$ to the token commitments data structure, where $P_k$ is the public key of the sender 110a that is receiving the one or more of the constituent assets 114a-114n from the prior owner. In such embodiments, the prior owner would have knowledge or possession of $S_i$, $P_k$ and/or $A_i$, and as such can generate similar or same ZKP as one generated by the sender 110a and provided to the smart contract to represent the transfer of the constituent assets 114a-114n to the recipient 110b. As such, to demonstrate to the smart contract that the sender 110a is the rightful (e.g., current) owner of the constituent assets 114a-114n, in some implementations, the sender 110a may also provide to the smart contract, via the computing node 102a, a ZKP that the sender 110a can generate the public identifier associated with the sender 110a on the ZKP-enabled DLN 100 from a corresponding secret identifier associated with the sender 110a on the ZKP-enabled DLN 100. For example, the public identifier associated with the sender 110a can be the public key of the sender 110a, and the sender 110a can provide the smart contract a ZKP that the sender 110a can derive or obtain the public key $P_k$ from the private key $V_k$ of the sender 110a. For example, the ZKP may include the proof that the public key $P_k$ can be obtained or derived by a cryptographic hashing of the private key, such as but not limited to, $P_k = H(V_k)$. As the private key $V_k$ is known only to the sender 110a, at least nominally, in such implementations, the prior sender or any other party or participant of the ZKP-enabled DLN 100 may not be able to generate such ZKP. As such, in some embodiments, the sender's claim that the constituent asset token commitments $Z_i$ belong to the sender 110a may be proved by verifying the ZKP, generated and provided to the smart contract by the sender 110a, that the sender 110a has knowledge that $Z_i$ can be obtained by computing $H(S_i \circledast P_k \circledast A_i)$ and that $P_k$ can be obtained from $V_k$ (e.g., $P_k = H(V_k)$).

In some embodiments, the sender 110a may also have to demonstrate to the smart contract that the constituent asset token commitment $Z_i$ is no longer valid before the smart contract can allow the addition of the recipient token commitment Z' onto the commitments data structure. The smart contract may enforce this condition to avoid a "double-spend" by the sender 110a, where the sender 110a can generate and send to other participants 110c-110e new recipient token commitment $Z_{new}'$ that represents an asset that includes one or more of the same constituent assets 114a-114n (the term "double spend" refers to the fact that the sender 110a would be transferring different recipient token commitments Z' and $Z_{new}'$ to different participants 110c-110e, even though the recipient token commitments Z' and $Z_{new}'$ represent assets that contain one or more of the same underlying constituent assets 114a-114n). In some embodiments, "double spend" by the sender 110a can be prevented by having the sender 110a generate and provide to the smart contract, via the computing node 102a, a nullifier that nullifies the constituent asset token commitment $Z_i$ that is already on the token commitments data structure. By requiring the sender 110a to nullify an existing valid token commitment $Z_i$ (e.g., a token commitment that is stored in the token commitments data structure) prior to the addition of a new recipient token commitment Z' into the token commitments data structure, in some implementations, the smart contract prevents the "double spend" problem, since the sender 110a can nullify the constituent asset token commitment $Z_i$ only once (hence only one Z' can be added into the commitments data structure, i.e., no "double spend").

In some embodiments, at 308, the nullifier of the constituent asset token commitment $Z_i$ can be constructed or generated out of the cryptographic nonce $S_i$ that was used to generate the constituent asset token commitment $Z_i$. The cryptographic nonce $S_i$, however, may be known to other participants of the ZKP-enabled DLN 100 (i.e., besides the sender 110a), such as a previous owner of the constituent asset 114a-114n currently represented by $Z_i$. To demonstrate to the smart contract that the nullifier is in fact constructed or generated by the sender 110a (who currently owns the constituent asset token commitments $Z_i$, and not by a previous owner that may know what $S_i$ is, for example), in some embodiments, the sender 110a may include in the nullifier a secret element or identifier that is known only to the sender 110a (or at least, a secret element or identifier that is not known to the rest of the ZKP-enabled DLN 100 participants 110c-110e). For example, in some embodiments, the nullifier can be computed via an application of a hashing function H on the cryptographic nonce $S_i$ and the private key of the sender 110a, $V_k$, as follows: $N_i = H(S_i \circledast V_k)$, where the combining operator $\circledast$ may include the XOR operator $\oplus$, the concatenation operator |, and/or the like. In some implementations, the sender 110a may compute or generate as many nullifiers $N_i$ as there are constituent asset token commitments $Z_i$ (and, correspondingly, constituent assets 114a-114n).

At 310, the sender 110a may provide (e.g., anonymously) the nullifier $N_i$ to the smart contract, via the computing node 102a, along with a ZKP that the sender 110a knows $N_i$ is obtained via an application of the hashing function H on the cryptographic nonce $S_i$ and the private key $V_k$. In some implementations, the hashing allows the sender 110a to hide the identity of the cryptographic nonce $S_i$ and/or the private key $V_k$, and the ZKP allows the sender 110a to convince the smart contract, if the proof is verified, that $N_i$ includes $S_i$ and $V_k$, without the sender 110a having to reveal $S_i$ and $V_k$ themselves to the smart contract or the participants of the ZKP-enabled DLN 100. In some embodiments, the ZKP-enabled DLN 100 may include a nullifier data structure that includes all the nullifiers that have been provided to the smart contract. For example, the nullifier data structure may be stored on the ZKP-enabled DLN 100 (e.g., the data structure may be stored on storage systems that are linked to or part of the computing nodes 102a-102e that make up the ZKP-enabled DLN 100). In such embodiments, the smart contract may check to see if the nullifier $N_i$ provided by the sender 110a is already present in the nullifier data structure, and if so, may reject the addition of the recipient token commitment Z' onto the commitments data structure as the presence of $N_i$ in the nullifier data structure indicates that the constituent asset token commitment $Z_i$ has already been nullified (which indicates that the sender 110a does not own the underlying constituent asset represented on the ZKP-enabled DLN 100 by $Z_i$, and as such cannot be in the position to transfer the asset 112, which includes the underlying constituent asset represented by $Z_i$ as a component or a part, to the recipient 110b).

Before the smart contract can allow the addition of the recipient token commitment Z' onto the commitments data structure, in some embodiments, the sender 110a may also have to demonstrate to the smart contract that the recipient token commitment Z' includes an identifier associated with the recipient (e.g., a public identifier such as the public key $P_k'$ of the recipient), an identifier that can be used to identify the asset being transferred to the recipient 110b (e.g., the combined asset token B) and/or the cryptographic nonce S'. To accomplish this goal without revealing identifying information about the public key $P_k'$, the combined asset token B and/or the cryptographic nonce S' on the ZKP-enabled DLN 100, at 310, the sender 110a may generate and provide to the smart contract, via the computing node 102a, a ZKP that Z' includes, or is generated using, the identifier associated with the recipient (e.g., the public key $P_k'$ of the recipient), the asset identifier (e.g., the combined asset token B) and/or the cryptographic nonce S'. Further, the sender 110a may have to demonstrate to the smart contract that the combined asset token B in fact includes the set of constituent asset tokens $A_i$, where i stands for the $i^{th}$ constituent asset 114a-114n, that were combined to form combined asset token B. For example, the sender 110a may have to demonstrate to the smart contract that $B = A_1 \circledast A_2 \circledast \ldots A_n$. In such embodiments, the sender 110a may generate and provide to the smart contract (e.g., anonymously), via the computing node 102a, a ZKP that the combined asset token B that identifies the combined asset 112 on the ZKP-enabled DLN 100 is obtained by combining the constituent asset tokens $A_i$ that identify the constituent assets 114a-114n that are combined to produce or form the combined asset 112 (e.g., the ZKP may be a proof that $B = A_1 \circledast A_2 \circledast \ldots A_n$). In addition, the sender 110a may have to demonstrate to the smart contract that H(B), which the sender 110 provided to the smart contract to be added into the double-spend preventer data structure, in fact contains the combined asset token B (the smart contract wouldn't know, based on just H(B), that B is included in H(B) as the hashing of the combined asset token B hides the identity of the combined asset token B). In such embodiments, the sender 110a may generate and provide to the smart contract (e.g., anonymously), via the computing node 102a, a ZKP that H(B) includes the combined asset token B. As noted above, the combining operator $\circledast$ may include the XOR operator $\oplus$, the concatenation operator |, and/or the like.

Upon receiving the above-identified ZKPs, in some embodiments, the smart contract may verify the ZKPs and/or check that none of the nullifiers $N_i$ is already included in the nullifier data structure of the ZKP-enabled DLN 100. As $N_i$ is configured to nullify the constituent asset token commitment $Z_i$ upon addition onto the nullifier data structure, in some implementations, its prior presence on the nullifier data structure would indicate that $Z_i$ has already been nullified, which would cause the smart contract to reject the addition of the recipient token commitment Z' onto the commitments data structure. In some embodiments, upon verifying that each of the nullifier $N_i$ is not included in the nullifier data structure, the smart contract may add the nullifiers into the nullifier data structure (after all the ZKPs are verified, for example).

As discussed above, the ZKPs provided by the sender 110a include (a) the ZKP that the nullifier $N_i$ is obtained via an application of a hashing function or algorithm on a cryptographic nonce and/or a private key on the ZKP-enabled DLN 100 of the sender 110a, (b) the ZKP that the constituent asset token commitment $Z_i$ is obtained via an application of a hashing function on the same cryptographic nonce $S_i$ used in generating the nullifier $N_i$, a public identifier on the ZKP-enabled DLN 100 of the sender 110a (e.g., the public key of the sender 110a) and/or the constituent asset token $A_i$, (c) the ZKP that the sender 110a can generate or derive the public identifier associated with the sender 110a from a secret identifier associated with the sender 110a (e.g., the sender 110a can derive its public key from its private key), (d) the ZKP that the recipient token commitment Z' is obtained via an application of a hashing function on a cryptographic nonce (e.g., different from the cryptographic nonce used to generate $Z_i$), a public identifier on the ZKP-enabled DLN 100 of the recipient 110b (e.g., the public key of the recipient 110b) and/or the combined asset token B, (e) the ZKP that H(B) includes B, e.g., H(B) is obtained via an application of a hashing function on the combined asset token B, and/or (f) the ZKP that the combined asset token B is obtained by combining the constituent asset tokens $A_i$. After verifying one or more of the above-identified ZKPs, at 312, the smart contract may allow the recipient token commitment Z' to be added onto the commitments data structure of the ZKP-enabled DLN 100, which signifies the representation, on the ZKP-enabled DLN 100, of the transfer of the asset 112 from the sender 110a to the recipient 110b.

In some embodiments, if the recipient 110b wishes to transfer the asset 112 to another participant 110c after receiving it from the sender 110a, the recipient 110b may do so by generating a new token commitment Z" using, amongst other things, the public identifier (e.g., public key) of the new recipient 110c and nullifying the existing token commitment Z'. The recipient 110b may not, however, be able to generate a new asset token to identify the asset 112, as the presence of the hash of the asset token B, H(B), in the preventer data structure would cause the smart contract to reject the token commitment Z" the recipient 110b would have to provide to the smart contract to represent the transfer of the asset to the new recipient 110c.

As discussed above, with the use of ZKPs, a sender 110a can represent on the ZKP-enabled DLN 100 a physical, off-chain asset 112, without having to disclose or reveal to other participants of the ZKP-enabled DLN 100 (or to the public) any identifying information about the combined asset 112 or its constituent assets 114a-114n (e.g., without revealing the asset token $A_i$ obtained by hashing identifying parameters of the constituent asset 114a-114n such as serial numbers, model numbers, asset name, etc., or the combined asset token B obtained by combining the asset tokens $A_i$). Further, the identity of the sender 110a as well as the identity of the recipient 110b can also remain hidden from the other participants of the ZKP-enabled DLN 100, since, for example, the sender 110a interacts with the smart contract anonymously, and the token commitments that include public identifiers such as $Z = H(S \circledast P_k \circledast A)$ and $Z' = H(S' \circledast P_k' \circledast B)$ are hashed, concealing or cloaking the identities of the sender 110a and/or the recipient 110b. The smart contract can verify the provided ZKPs, and allow the recipient token commitment Z' to be added onto the token commitments data structure, without having access to information that reveals the identities of the assets and/or the transaction participants.

For example, as noted above, the sender 110*a* provides to the smart contract anonymously (and hence hidden from at least the other participants 110*c*-110*e*) the constituent token commitment $Z_i = H(S_i \oplus P_k \oplus A_i)$, the recipient token commitment $Z' = H(S' \oplus P_k' \oplus B)$ and the nullifier $N_i = H(S_i \oplus S_k)$, without revealing $S_i$, $P_k$, $S'$, $P_k'$, $A_i$, $B$ and/or $S_k$, thereby protecting the identities of the sender 110*a*, the recipient 110*b* and/or the assets identified by A and/or B. As noted above, the combining operator $\oplus$ may include the XOR operator $\oplus$, the concatenation operator |, and/or the like. In some implementations, the identity of the sender 110*a* can be protected as the sender 110*a* communicates with the smart contract anonymously. The smart contract can, without having access to any of these information, verify the provided ZKPs and allow (i) the addition of the recipient token commitment $Z'$ onto the token commitments data structure and/or (ii) the nullification of the constituent asset token commitment $Z_i$ (e.g., invalidating the constituent asset token commitment $Z_i$ stored in the commitments data structure of ZKP-enabled DLN 100). As such, the use of ZKPs in the ZKP-enabled DLN 100 allows for the representation of a transaction including the transfer of the asset 112 on the ZKP-enabled DLN 100 while preserving the confidentiality or privacy of the participants of the transaction (such as sender 110*a* and recipient 110*b*) as well as the assets (such as the combined asset 112 and its constituent assets 114*a*-114*n*) and the transaction itself (e.g., serial numbers, asset tokens, etc. generated during the transaction).

Some embodiments of the current disclosure include a method comprising: receiving a request that is configured to cause a transfer of a combined asset from a sender to a recipient, the combined asset including a first asset and a second asset, the first asset and the second asset represented on a distributed ledger-based network (DLN) by a first token commitment and a second token commitment, respectively; and effecting, in response to the request and on the DLN, a registration of the transfer of the combined asset from the sender to the recipient, the registration occurring after verification of a zero-knowledge proof (ZKP) provided by a provider that the provider has knowledge of an identity of: (1) a first asset token of a first identifying parameter of the first asset, the first token commitment obtained via an application of a first hashing function on the first asset token; (2) a second asset token of a second identifying parameter of the second asset, the second token commitment obtained via an application of a second hashing function on the second asset token; and/or (3) a combined asset token including a combination of the first asset token and the second asset token, a third token commitment representing a combined asset on the DLN obtained via an application of a third hashing function on the combined asset token.

In some embodiments, the combined asset token consists the first asset token and the second asset token, the ZKP including the ZKP that the provider has knowledge of the combined asset token consisting the first asset token and the second asset token.

In some embodiments, the ZKP includes the ZKP that the provider has knowledge of an identity of: (a) a first identifier associated with the sender, (i) the first token commitment obtained via the application of the first hashing function on the first identifier; and/or (ii) the second token commitment obtained via the application of the second hashing function on the first identifier; and/or (b) a second identifier associated with the recipient, the third token commitment obtained via the application of the third hashing function on the second identifier.

In some embodiments, the ZKP includes the ZKP that the provider has knowledge of an identity of: (a) a first identifier associated with the sender, (i) the first token commitment obtained via the application of the first hashing function on the first identifier; and/or (ii) the second token commitment obtained via the application of the second hashing function on the first identifier, the first identifier including a public key of the sender on the DLN; and/or (b) a second identifier associated with the recipient, the third token commitment obtained via the application of the third hashing function on the second identifier, the second identifier including a public key of the recipient on the DLN.

In some embodiments, the ZKP includes the ZKP that the provider has knowledge of an identity of a first nullifier and/or a second nullifier, (a) the first nullifier obtained via an application of a fourth hashing function on a first cryptographic nonce and/or a secret identifier associated with the sender, and/or (b) the second nullifier obtained via an application of a fifth hashing function on a second cryptographic nonce and/or the secret identifier associated with the sender, presence of the first nullifier and/or the second nullifier in a nullifier data structure on the DLN indicating invalidity of the first token commitment and/or the second token commitment, respectively.

In some embodiments, the ZKP includes the ZKP that the provider has knowledge of an identity of a first nullifier and/or a second nullifier, (a) the first nullifier obtained via an application of a fourth hashing function on a first serial number and/or a secret identifier associated with the sender, and/or (b) the second nullifier obtained via an application of a fifth hashing function on a second serial number and/or the secret identifier associated with the sender, (i) presence of the first nullifier and/or the second nullifier in a nullifier data structure on the DLN indicating invalidity of the first token commitment and/or the second token commitment, respectively, (ii) the application of the first hashing function including the application of the first hashing function on the first cryptographic nonce, (iii) the application of the second hashing function including the application of the second hashing function on the second cryptographic nonce.

In some embodiments, the ZKP includes the ZKP that the provider has knowledge of an identity of a first nullifier and/or a second nullifier, (a) the first nullifier obtained via an application of a fourth hashing function on a first cryptographic nonce and/or a secret identifier associated with the sender, and/or (b) the second nullifier obtained via an application of a fifth hashing function on a second cryptographic nonce and/or the secret identifier associated with the sender, (i) presence of the first nullifier and/or the second nullifier in a nullifier data structure on the DLN indicating invalidity of the first token commitment and/or the second token commitment, respectively, (ii) the secret identifier including the private key of the sender.

In some embodiments, the ZKP includes the ZKP that the provider is capable of deriving a public identifier associated with the sender from a secret identifier associated with the sender.

In some embodiments, the ZKP includes the ZKP that the provider is capable of deriving a public identifier associated with the sender from a secret identifier associated with the sender, the public identifier and the secret identifier including a public key and a private key, respectively, of the sender on the DLN.

In some embodiments, the registration of the transfer occurs without revealing any identifying information of the sender and/or the recipient, the identifying information of the sender and/or the recipient including a public key of the sender, a private key of the sender, a public key of the recipient and/or a private key of the recipient, on the DLN.

In some embodiments, the registration of the transfer occurs without revealing any identifying information of the first token commitment, the second token commitment, a first cryptographic nonce and/or a second cryptographic nonce, the first token commitment obtained via the application of the first hashing function on the first cryptographic nonce, the second token commitment obtained via the application of the second hashing function on the first cryptographic nonce.

In some embodiments, the application of the third hashing function includes the application of the third hashing function on an identifier of the recipient on the DLN.

In some embodiments, the application of the third hashing function includes the application of the third hashing function on an identifier of the recipient on the DLN, the identifier including a public key of the recipient on the DLN.

While various embodiments have been described and illustrated herein, one will readily envision a variety of other means and/or structures for performing the function and/or obtaining the results and/or one or more of the advantages described herein, and each of such variations and/or modifications is deemed to be within the scope of the embodiments described herein. More generally, one will readily appreciate that all parameters, dimensions, materials, and configurations described herein are meant to be exemplary and that the actual parameters, dimensions, materials, and/or configurations will depend upon the specific application or applications for which the teachings is/are used. One will recognize, or be able to ascertain using no more than routine experimentation, many equivalents to the specific embodiments described herein. It is, therefore, to be understood that the foregoing embodiments are presented by way of example only and that, within the scope of the disclosure, including the appended claims and equivalents thereto, disclosed embodiments may be practiced otherwise than as specifically described and claimed. Embodiments of the present disclosure are directed to each individual feature, system, tool, element, component, and/or method described herein. In addition, any combination of two or more such features, systems, articles, elements, components, and/or methods, if such features, systems, articles, elements, components, and/or methods are not mutually inconsistent, is included within the scope of the present disclosure.

The above-described embodiments can be implemented in any of numerous ways. For example, embodiments may be implemented using hardware, software or a combination thereof. When implemented in software, the software code can be stored (e.g., on non-transitory memory) and executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, netbook computer, or a tablet computer. Additionally, a computer may be embedded in a device not generally regarded as a computer but with suitable processing capabilities, including a smart phone, smart device, or any other suitable portable or fixed electronic device.

Also, a computer can have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer can receive input information through speech recognition or in other audible format.

Such computers can be interconnected by one or more networks in any suitable form, including a local area network or a wide area network, such as an enterprise network, and intelligent network (IN) or the Internet. Such networks can be based on any suitable technology and can operate according to any suitable protocol and can include wireless networks, wired networks or fiber optic networks.

The various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine.

In this respect, various disclosed concepts can be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but can be distributed in a modular fashion amongst a number of different computers or processors to implement various aspects of the disclosure.

Computer-executable instructions can be in many forms, such as program modules, executed by one or more computers or other devices. Generally, program modules include routines, programs, objects, components, data structures, etc. that perform particular tasks or implement particular abstract data types. Typically the functionality of the program modules can be combined or distributed as desired in various embodiments.

Also, data structures can be stored in computer-readable media in any suitable form. For simplicity of illustration, data structures may be shown to have fields that are related through location in the data structure. Such relationships can likewise be achieved by assigning storage for the fields with locations in a computer-readable medium that convey relationship between the fields. However, any suitable mechanism can be used to establish a relationship between information in fields of a data structure, including through the use of pointers, tags or other mechanisms that establish relationship between data elements.

Also, various concepts can be embodied as one or more methods, of which an example has been provided. The acts performed as part of the method may be ordered in any suitable way. Accordingly, embodiments can be constructed in which acts are performed in an order different than illustrated, which can include performing some acts simultaneously, even though shown as sequential acts in illustrative embodiments. All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of." "Consisting essentially of," when used in claims, shall have its ordinary meaning as used in the field of patent law.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

All transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, comprising:
    receiving a request that is configured to cause a first non-fungible asset and a second non-fungible asset to be combined into a combined non-fungible asset, neither the first non-fungible asset nor the second non-fungible asset being an amount of a currency;
    generating, in response to the request, a combined non-fungible token identifying the combined non-fungible asset, the combined non-fungible token including a concatenation of a first non-fungible token representing the first non-fungible asset and a second non-fungible token representing the second non-fungible asset,
        the combined non-fungible asset not being an amount of the currency,
        the first non-fungible token obtained via an application of a first hashing function on a first identifying parameter uniquely identifying the first non-fungible asset, and
        the second non-fungible token obtained via an application of a second hashing function on a second identifying parameter uniquely identifying the second non-fungible asset;
    providing, by a provider and to a self-executing code segment on a distributed ledger-based network (DLN), a zero-knowledge proof (ZKP) that the provider has knowledge of an identity of the combined non-fungible token; and
    receiving, upon verification of the ZKP by the self-executing code segment, a confirmation of a registration of the combined non-fungible asset on the DLN.

2. The method of claim 1, wherein receiving the confirmation occurs after addition of the combined non-fungible token into a double-spend preventer data structure on the DLN after verifying that a hash of the combined non-fungible token is not stored in the double-spend preventer data structure prior to the registration of the combined non-fungible asset on the DLN.

3. The method of claim 1, wherein receiving the confirmation occurs without revealing any identifying information of the first non-fungible asset, the second non-fungible asset, the combined non-fungible asset, the first identifying parameter and/or the second identifying parameter.

4. The method of claim 1, wherein receiving the confirmation occurs without revealing any identifying information of an owner of the first non-fungible asset, the second non-fungible asset and/or the combined non-fungible asset, the identifying information of the owner including a public key of the owner and/or a private key of the owner on the DLN.

5. A method, comprising:
receiving a request that is configured to cause a transfer of a combined non-fungible asset from a sender to a recipient, the combined non-fungible asset
including a first non-fungible asset and a second non-fungible asset, the first non-fungible asset and the second non-fungible asset (1) not being an amount of a currency, and (2) represented on a distributed ledger-based network (DLN) by a first token commitment and a second token commitment, respectively; and
causing, in response to the request and on the DLN, a registration of the transfer of the combined non-fungible asset from the sender to the recipient,
the registration occurring after verification of a zero-knowledge proof (ZKP) provided by a provider that the provider has knowledge of an identity of:
a combined non-fungible token identifying the combined non-fungible asset and including a concatenation of a first non-fungible token and a second non-fungible token, a third token commitment representing the combined non-fungible asset on the DLN obtained via an application of a third hashing function on the combined non-fungible token,
the first non-fungible token of a first identifying parameter uniquely identifying the first non-fungible asset, the first token commitment obtained via an application of a first hashing function on the first non-fungible token; and
the second non-fungible token of a second identifying parameter uniquely identifying the second non-fungible asset, the second token commitment obtained via an application of a second hashing function on the second non-fungible token.

6. The method of claim 5, wherein the combined non-fungible token consists of the first non-fungible token and the second non-fungible token.

7. The method of claim 5, wherein:
the combined non-fungible token consists the first non-fungible token and the second non-fungible token,
the ZKP including the ZKP that the provider has knowledge of the combined non-fungible token consisting the first non-fungible token and the second non-fungible token.

8. The method of claim 5, wherein the ZKP includes the ZKP that the provider has knowledge of an identity of:
(a) a first identifier associated with the sender,
(i) the first token commitment obtained via the application of the first hashing function on the first identifier; and/or
(ii) the second token commitment obtained via the application of the second hashing function on the first identifier; and/or
(b) a second identifier associated with the recipient, the third token commitment obtained via the application of the third hashing function on the second identifier.

9. The method of claim 5, wherein the ZKP includes the ZKP that the provider has knowledge of an identity of:
(a) a first identifier associated with the sender,
(i) the first token commitment obtained via the application of the first hashing function on the first identifier; and/or
(ii) the second token commitment obtained via the application of the second hashing function on the first identifier,
the first identifier including a public key of the sender on the DLN; and/or
(b) a second identifier associated with the recipient, the third token commitment obtained via the application of the third hashing function on the second identifier, the second identifier including a public key of the recipient on the DLN.

10. The method of claim 5, wherein the ZKP includes the ZKP that the provider has knowledge of an identity of a first nullifier and/or a second nullifier,
(a) the first nullifier obtained via an application of a fourth hashing function on a first serial number and/or a secret identifier associated with the sender, and/or
(b) the second nullifier obtained via an application of a fifth hashing function on a second serial number and/or the secret identifier associated with the sender,
presence of the first nullifier and/or the second nullifier in a nullifier data structure on the DLN indicating invalidity of the first token commitment and/or the second token commitment, respectively.

11. The method of claim 5, wherein the ZKP includes the ZKP that the provider has knowledge of an identity of a first nullifier and/or a second nullifier,
(a) the first nullifier obtained via an application of a fourth hashing function on a first serial number and/or a secret identifier associated with the sender, and/or
(b) the second nullifier obtained via an application of a fifth hashing function on a second serial number and/or the secret identifier associated with the sender,
(i) presence of the first nullifier and/or the second nullifier in a nullifier data structure on the DLN indicating invalidity of the first token commitment and/or the second token commitment, respectively,
(ii) the application of the first hashing function including the application of the first hashing function on the first serial number,
(iii) the application of the second hashing function including the application of the second hashing function on the second serial number.

12. The method of claim 5, wherein the ZKP includes the ZKP that the provider has knowledge of an identity of a first nullifier and/or a second nullifier,
(a) the first nullifier obtained via an application of a fourth hashing function on a first serial number and/or a secret identifier associated with the sender, and/or
(b) the second nullifier obtained via an application of a fifth hashing function on a second serial number and/or the secret identifier associated with the sender,
(i) presence of the first nullifier and/or the second nullifier in a nullifier data structure on the DLN indicating invalidity of the first token commitment and/or the second token commitment, respectively,
(ii) the secret identifier including the private key of the sender.

13. The method of claim 5, wherein the ZKP includes the ZKP that the provider derives a public identifier associated with the sender from a secret identifier associated with the sender.

14. The method of claim 5, wherein the ZKP includes the ZKP that the provider derives a public identifier associated with the sender from a secret identifier associated with the sender, the public identifier and the secret identifier including a public key and a private key, respectively, of the sender on the DLN.

15. The method of claim 5, wherein the registration of the transfer occurs without revealing any identifying information of the first non-fungible asset, the second non-fungible asset, the combined non-fungible asset, the first identifying parameter and/or the second identifying parameter.

16. The method of claim 5, wherein the registration of the transfer occurs without revealing any identifying information of the sender and/or the recipient, the identifying information of the sender and/or the recipient including a public key of the sender, a private key of the sender, a public key of the recipient and/or a private key of the recipient, on the DLN.

17. The method of claim 5, wherein the registration of the transfer occurs without revealing any identifying information of the first token commitment, the second token commitment, a first serial number and/or a second serial number,
the first token commitment obtained via the application of the first hashing function on the first serial number,
the second token commitment obtained via the application of the second hashing function on the first serial number.

18. The method of claim 5, wherein the first token commitment, the second token commitment and/or the third token commitment represent non-fungible tokens.

19. The method of claim 5, wherein the application of the third hashing function includes the application of the third hashing function on an identifier of the recipient on the DLN.

20. The method of claim 5, wherein the application of the third hashing function includes the application of the third hashing function on an identifier of the recipient on the DLN, the identifier including a public key of the recipient on the DLN.

21. A method, comprising:
receiving a request that is configured to cause a first non-fungible asset and a second non-fungible asset to be combined into a combined non-fungible asset, neither the first non-fungible asset, the second non-fungible asset, nor the combined non-fungible asset being an amount of a currency; and
causing, in response to the request and on a distributed ledger-based network (DLN), a registration of the combined non-fungible asset on the DLN,
the registration occurring after verification of a zero-knowledge proof (ZKP) provided by a provider that the provider has knowledge of an identity of a combined non-fungible token,
the combined non-fungible token including a concatenation of a first non-fungible token and a second non-fungible token,
the first non-fungible token obtained via an application of a first hashing function on a first identifying parameter uniquely identifying the first non-fungible asset, and
the second non-fungible token obtained via an application of a second hashing function on a second identifying parameter uniquely identifying the second non-fungible asset.

22. The method of claim 1, wherein:
the first non-fungible asset and the second non-fungible asset represented on the DLN by a first token commitment and a second token commitment, respectively,
the first token commitment obtained via an application of the first hashing function on the first non-fungible token, a public key, and a first cryptographic nonce, and
the second token commitment obtained via an application of the second hashing function on the second non-fungible token, the public key, and a second cryptographic nonce.

23. The method of claim 1, further comprising:
causing, in response to the registration of the combined non-fungible asset, generating a first nullifier via an application of the first hashing function on the first non-fungible token and a private key of a sender; and
causing, in response to the registration of the combined non-fungible asset, generating a second nullifier via an application of the second hashing function on the second non-fungible token and the private key of the sender.

24. The method of claim 5, wherein:
the first non-fungible asset and the second non-fungible asset represented on the DLN by the first token commitment and the second token commitment, respectively,
the first token commitment obtained via an application of the first hashing function on the first non-fungible token, a public key, and a first cryptographic nonce, and
the second token commitment obtained via an application of the second hashing function on the second non-fungible token, the public key, and a second cryptographic nonce.

25. The method of claim 5, further comprising:
causing, in response to the registration of the combined non-fungible asset, generating a first nullifier via an application of the first hashing function on the first non-fungible token and a private key of the sender; and
causing, in response to the registration of the combined non-fungible asset, generating a second nullifier via an application of the second hashing function on the second non-fungible token and the private key of the sender.

26. The method of claim 21, wherein:
the first non-fungible asset and the second non-fungible asset represented on the DLN by a first token commitment and a second token commitment, respectively,
the first token commitment obtained via an application of the first hashing function on the first non-fungible token, a public key, and a first cryptographic nonce, and
the second token commitment obtained via an application of the second hashing function on the second non-fungible token, the public key, and a second cryptographic nonce.

27. The method of claim 21, further comprising:
causing, in response to the registration of the combined non-fungible asset, generating a first nullifier via an application of the first hashing function on the first non-fungible token and a private key of a sender; and
causing, in response to the registration of the combined non-fungible asset, generating a second nullifier via an application of the second hashing function on the second non-fungible token and the private key of the sender.

* * * * *